United States Patent
Wu

(10) Patent No.: US 12,517,004 B2
(45) Date of Patent: Jan. 6, 2026

(54) REFLECTIVE PERISCOPE FOR EXTENDED-PUPIL PARALLELISM AND VIRTUAL IMAGING DISTANCE MEASUREMENTS

(71) Applicant: MLOptic Corp, Redmond, WA (US)

(72) Inventor: Pengfei Wu, Bellevue, WA (US)

(73) Assignee: MLOptic Corp., Redmond, WA (US)

(*) Notice: Subject to any disclaimer, the term of this patent is extended or adjusted under 35 U.S.C. 154(b) by 93 days.

(21) Appl. No.: 18/642,735

(22) Filed: Apr. 22, 2024

(65) Prior Publication Data

US 2025/0334481 A1     Oct. 30, 2025

(51) Int. Cl.
*G01M 11/02* (2006.01)
*G01B 11/27* (2006.01)

(52) U.S. Cl.
CPC ....... *G01M 11/0221* (2013.01); *G01B 11/272* (2013.01); *G01M 11/0207* (2013.01); *G01M 11/0257* (2013.01)

(58) Field of Classification Search
CPC ......... G01M 11/0221; G01M 11/0207; G01M 11/0257; G01B 11/272
See application file for complete search history.

(56) References Cited

U.S. PATENT DOCUMENTS

| | | | | |
|---|---|---|---|---|
| 5,192,981 A * | 3/1993 | Slutter | ............... | G01J 3/1804 |
| | | | | 356/334 |
| 5,880,834 A * | 3/1999 | Chrisp | ............... | G01J 3/0294 |
| | | | | 356/328 |
| 6,023,330 A * | 2/2000 | Marshall | ............... | G01J 3/36 |
| | | | | 356/328 |
| 6,522,717 B1 * | 2/2003 | Murakami | ............... | G21K 7/00 |
| | | | | 430/5 |
| 7,005,649 B1 * | 2/2006 | Tezuka | ............... | G01N 21/47 |
| | | | | 250/372 |
| 2014/0198222 A1 * | 7/2014 | Blanc | ............... | G01M 11/005 |
| | | | | 348/180 |
| 2015/0355447 A1 * | 12/2015 | Dam | ............... | G02B 21/002 |
| | | | | 359/326 |
| 2017/0184833 A1 * | 6/2017 | Okamoto | ............... | G01J 3/0208 |
| 2018/0058814 A1 * | 3/2018 | Guthrie | ............... | F41G 3/165 |
| 2023/0168511 A1 * | 6/2023 | Sluka | ............... | G02B 27/0093 |
| | | | | 359/630 |

* cited by examiner

*Primary Examiner* — Sang H Nguyen
(74) *Attorney, Agent, or Firm* — Jong Patent Firm; Cheng Ning Jong; Tracy P. Jong

(57) ABSTRACT

An optical system for measuring a parallelism of rays of a light emitter and virtual imaging distances of the light emitter, including an enclosure including a front end and a rear end, a pair of apertures configured to be disposed on the front end of the enclosure on a central plane, a pair of first mirrors disposed interior of the enclosure; and a second mirror disposed interior of the enclosure, wherein the pair of apertures are configured to allow two sets of rays into the enclosure at the pair of first mirrors before being directed to the second mirror which redirects them to be cast as a first and second spots on an imaging plane, wherein a parallelism of the two sets of rays is based on a correspondence of a distance between the first and second spots with a distance between the two sets of rays.

17 Claims, 34 Drawing Sheets

| | Surface Type | Radius (mm) | Thickness (mm) | Material | Clear Sem-Dia | Conic | Decenter Y |
|---|---|---|---|---|---|---|---|
| 0 | Object | Infinity | Infinity (or other VID) | | 3.491 | 0.000 | |
| 1 | Stop | Infinity | 30.000 | | 1.500 | 0.000 | |
| 2 | Coordinate Break | Infinity | 0.000 | | 0.000 | - | 10.000 |
| 3 | Standard | -90.000 | -19.175 | Mirror | 12.500 | -0.950 | |
| 4 | Standard | Infinity | 19.175 | Mirror | 8.000 | 0.000 | -10.000 |
| 5 | Coordinate Break | Infinity | -19.175 | | 0.000 | - | |
| 6 | Dummy | Infinity | 36.796 | | 6.000 | 0.000 | |
| 7 | Image | Infinity | - | | 3.368 | 0.000 | |

Different aperture size @ VID = infinity
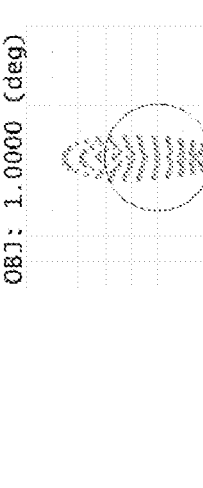
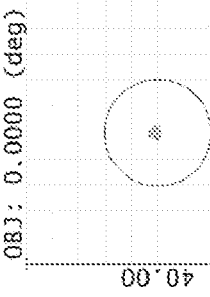
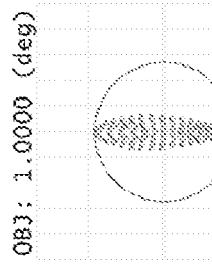
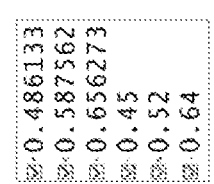
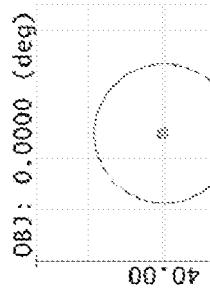
FIG. 19

Diffraction Limit Performance

| Apertures (in diameter) | 4 mm | 3 mm | 2 mm | 1mm |
|---|---|---|---|---|
| Aperture Distance (D) | 20 mm | 20 mm | 20 mm | 20mm |
| VID (in diopter) | -5D to +3D | -10D to +3D | -10D to +3D | -50D to +3D |
| VID (in mm) | 200mm to -330mm | 100mm to -330mm | 100mm to -330mm | 20mm to -330mm |

FIG. 20

Variable Aperture Distances

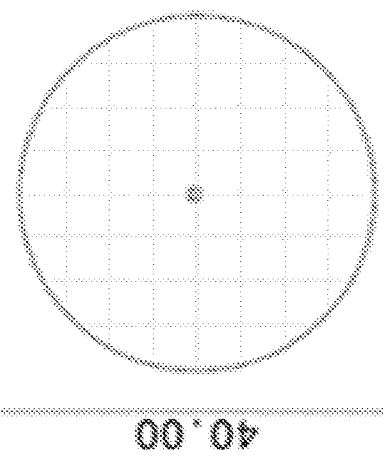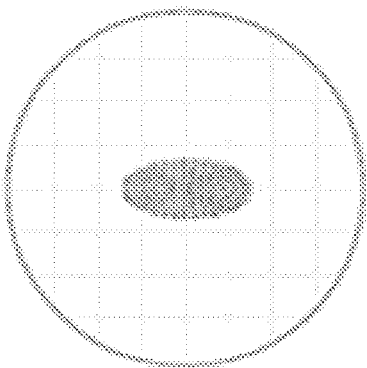
FIG. 24

VID Measurements

| | VID (diopter) | +3 | +2 | +1 | 0 | -1 | -2 | -3 | -5 | -10 |
|---|---|---|---|---|---|---|---|---|---|---|
| Preset | VID (mm) | -330 | -500 | -1000 | infinity | 1000 | 500 | 330 | 200 | 100 |
| | D (mm) | 20 | 20 | 20 | 20 | 20 | 20 | 20 | 20 | 20 |
| measured | meas. d (mm) | -2.636 | -1.770 | -0.902 | 0 | 0.920 | 1.876 | 2.884 | 4.944 | 10.846 |
| calculated | cal. Δ (mm) | -5.783 | -3.883 | -1.979 | 0 | 2.018 | 4.115 | 6.349 | 10.846 | 23.793 |
| | cal. VID (mm) | -334.618 | -505.950 | -1007.807 | infinity | 1018.913 | 507.612 | 334.528 | 202.272 | 100.672 |

FIG. 30

REFLECTIVE PERISCOPE FOR EXTENDED-PUPIL PARALLELISM AND VIRTUAL IMAGING DISTANCE MEASUREMENTS

BACKGROUND OF THE INVENTION

1. The Field of the Invention

The present invention relates to a periscope useful for parallelism and virtual imaging distance measurements. More specifically, the present invention is directed to a periscope useful for parallelism and virtual imaging distance measurements using mirrors.

2. Background Art

Exit Pupil Expansion (EPE) in extended reality (XR), e.g., augmented reality (AR) and virtual reality (VR) devices, refers to the enlargement of the exit pupil when viewing augmented content through the device. The exit pupil is a virtual aperture where light rays leave the XR display optics or eyepiece to enter the user's eyes. EPE is crucial for achieving a wide field of view (FOV) in XR devices. A larger exit pupil allows for more light rays to enter the user's eyes, resulting in a wider field of view and a more immersive XR experience. Users can see more augmented content without having to adjust the device or their viewing position constantly. Since each person may have a unique inter pupillary distance (IPD) and pupil sizes, a larger exit pupil offers more flexibility in terms of head movement and eye positioning while maintaining a clear view of the augmented content. Users can experience greater comfort and usability as they interact with XR applications, particularly during extended use sessions. EPE can help reduce eye strain and fatigue associated with prolonged XR usage. By providing a larger exit pupil, XR devices distribute light more evenly across the user's pupils, minimizing the need for constant refocusing and adjustment. A wider exit pupil contributes to a more immersive XR experience by allowing users to perceive the augmented content seamlessly integrated with its surrounding environment. This enhances the sense of presence and realism, making the XR interactions feel more natural and engaging.

Optical parallelism refers to the consistent alignment of optical rays from the same field angle to reach the user's eyes. It is extremely critical to maintain the parallelism or consistency of optical rays within the EPE in XR devices to ensure that virtual elements or information presented to the user through XR technology align correctly with the real world, creating a seamless and immersive experience. In addition, optical parallelism also imparts significant impacts on the optical imaging quality of XR devices since inconsistent rays can blur the ideal optical spot supported to be formed in the human eye. Many XR devices use waveguides, holographic gratings or other optical components to guide and project light onto the user's eyes. Maintaining parallelism within these optical systems is essential to avoid distortions, aberrations, or misalignments that can disrupt the XR experience. Parallel optical rays contribute to the overall image quality and clarity of the XR display. Misaligned rays can lead to distortions, aberrations, and reduced image sharpness. By preserving parallelism, XR devices can deliver high-quality visual content. XR devices need to be accurately calibrated to ensure that the virtual content aligns correctly with the user's field of view, depth perception, and physical environment. Maintaining optical ray parallelism is a prerequisite to enable precise alignment of a virtual scene's rays with the user's actual visual perception. This involves a combination of precise calibration, alignment, accurate tracking and rendering techniques. Optical ray parallelism can also relate to the tracking and sensing systems used in XR devices. These systems monitor the user's movements and adjust the virtual content in real time. Ensuring that the virtual rays remain parallel to the user's physical perspective helps maintain a consistent and responsive XR experience. Many XR applications involve overlaying digital information onto the user's view of the physical world. Parallel optical rays ensure that this overlay is accurate and properly aligned, enabling users to access information in a contextually relevant and intuitive manner. Parallel optical rays are especially critical for XR applications where precise alignment is essential, such as medical visualization, industrial maintenance, architectural design, and navigation assistance. In these contexts, misalignment could lead to serious consequences or errors.

There is several optical equipment that can be used for optical ray measurements in XR metrology, e.g., an optical collimator, a wavefront sensor or an interferometer. An optical collimator can produce a parallel beam of light while measuring the reflected light from a target. As such, it is very useful for optical alignment. It can also be used to directly measure incoming light rays from a device such as XR device to assess the quality of beam collimation. However, an optical collimator has a single optical aperture and thus it can only measure a single beam of light rays, making it difficult to compare the ray parallelism of two beams or light rays from different locations, e.g., light emitted from different eye box locations or different areas within the EPE. Although it can scan different areas depending on the aperture size of the collimator, the motion is undesirable because it inevitably introduces errors. In addition, an optical collimator commonly comes with a small FOV, e.g., less than 1 degree, which is too small for XR applications.

A wavefront sensor is useful for measuring the shape and characteristics of an optical wavefront, and thus it is useful for obtaining the divergence of light rays. The technique for using a wavefront sensor is a relatively new technique for wavefront measurements based on a Shack-Hartmann sensor which combines a two-dimensional detector with a lenslet array, allowing direct wavefront measurement. Shack-Hartmann sensors were developed for adaptive optics and have been widely used in optical metrology and laser diagnostics. However, the Shack-Hartmann sensors have limited spatial resolution and may not be able to accurately measure small wavefront distortions. The sensors also need be pre-calibrated and routinely by an experienced person in order to correctly measure the optical wavefront, especially when the test environments have changed.

An interferometer uses the interference of superimposed electromagnetic waves to extract the phase and intensity information from an object under test. The equipment has been widely used in the measurements of microscopic displacements, refractive index changes and surface irregularities for inspections of optical components or systems in both science and industry. Similar to the wavefront sensor, it can also be used to measure the optical ray parallelism. However, it is very sensitive to the changes of test environments, such as vibration, movement, acoustic noise, air turbulence, temperature, and humidity. They also have very small dynamic range for the measurements and are good only for measuring small changes rather than large range of measurements. The FOV is typically narrow as well, which limits their ability to observe larger angles. In addition, interferometers can be complex and difficult to set up and maintain, requiring specialized knowledge and technical skills. As such, most interferometers are expensive and bulky, especially those that have high sensitivity and spatial resolution.

All of the above devices and methods are useful for measuring optical rays from the whole FOV but they are unable to sample optical rays from different eye box locations or different pupils. In EPE devices, optical rays from the same field angle do not mean they are emitted from the same eye box locations. Therefore, it is very important to have an effective tool to measure and compare the optical parallelism of rays from different eye boxes or pupils.

There exists a need for an optical system useful for measuring optical parallelism that is suitable for EPE devices to properly cover different eye box or pupil locations commensurate with XR devices.

SUMMARY OF THE INVENTION

In accordance with the present invention, there is provided an optical system for measuring a parallelism of light rays of a light emitter and virtual imaging distances (VIDs) of the light emitter, the optical system including:
(a) an enclosure including a front end and a rear end;
(b) a pair of apertures configured to be disposed on the front end of the enclosure on a central plane;
(c) a pair of first mirrors disposed interior of the enclosure; and
(d) a second mirror disposed interior of the enclosure, wherein a first aperture of the pair of apertures is configured to allow a first set of light rays into the enclosure at a first of the pair of first mirrors before being directed to the second mirror which redirects it to be cast as a first spot on an imaging plane, a second aperture of the pair of apertures is configured to allow a second set of light rays into the enclosure at a second of the pair of first mirrors before being directed to the second mirror which redirects it to be cast as a second spot on the imaging plane, wherein a parallelism of the first set of light rays with respect to the second set of light rays is based on a correspondence of a distance between the first spot and the second spot with a distance between the first set of light rays and the second set of light rays and a VID of the light emitter is based at least in part on an offset of the imaging plane from the focus position of each of the first mirrors when the light emitter is not optically disposed at infinity.

In one embodiment, each of the first mirrors is a concave mirror. In one embodiment, the pair of first mirrors are portions of a larger mirror. In one embodiment, each first mirror of the pair of first mirrors includes a radius of about 200-400 mm. In one embodiment, the light emitter is a waveguide. In one embodiment, the waveguide is an exit pupil expansion device. In one embodiment, the imaging plane is an imaging plane of an image capture device. In one embodiment, the image capture device includes a controller configured to receive an image of the first spot and the second spot, wherein the controller is configured to determine if the first spot and the second spot are disposed on a central plane of the optical system and a distance between the first spot and the second spot corresponds with a distance between the first set of light rays and the second set of light rays, if at least one of the first spot and the second spot is not disposed on the central plane, the first set of light rays and the second set of light rays are not disposed in parallel and if the distance between the first spot and the second spot does not correspond with the distance between the first set of light rays and the second set of light rays, the first set of light rays and the second set of light rays are not disposed in parallel. In one embodiment, at least one of the first set of light rays and the second set of light rays includes a crosshair shape such that an angular deviation of the first set of light rays or the second set of light rays is discernible on the imaging plane.

An object of the present invention is to provide an apparatus useful for measuring optical parallelism in extended reality (XR) metrology.

Another object of the present invention is to provide an apparatus useful for measuring VIDs.

Another object of the present invention is to provide an apparatus useful for measuring optical parallelism in extended reality (XR) metrology and VIDs.

Another object of the present invention is to provide an apparatus useful for measuring optical parallelism in extended reality (XR) metrology and VIDs without color issues.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 19 is a diagram depicting spot diagrams of the present reflective optical system with the object distance or VID at infinity under aperture sizes of 3 mm and 4 mm.

FIG. 20 is a table summarizing various parameters under which the performance of the present reflective optical system remains diffraction-limited;

FIG. 24 is a spot diagram of the present reflective optical system with an aperture distance D=20 mm under an object distance or a VID at infinity and an aperture of 2 mm in diameter;

FIG. 30 depicts measurement results of object distances or VIDs compared to preset values;

PARTS LIST

Figure 1:
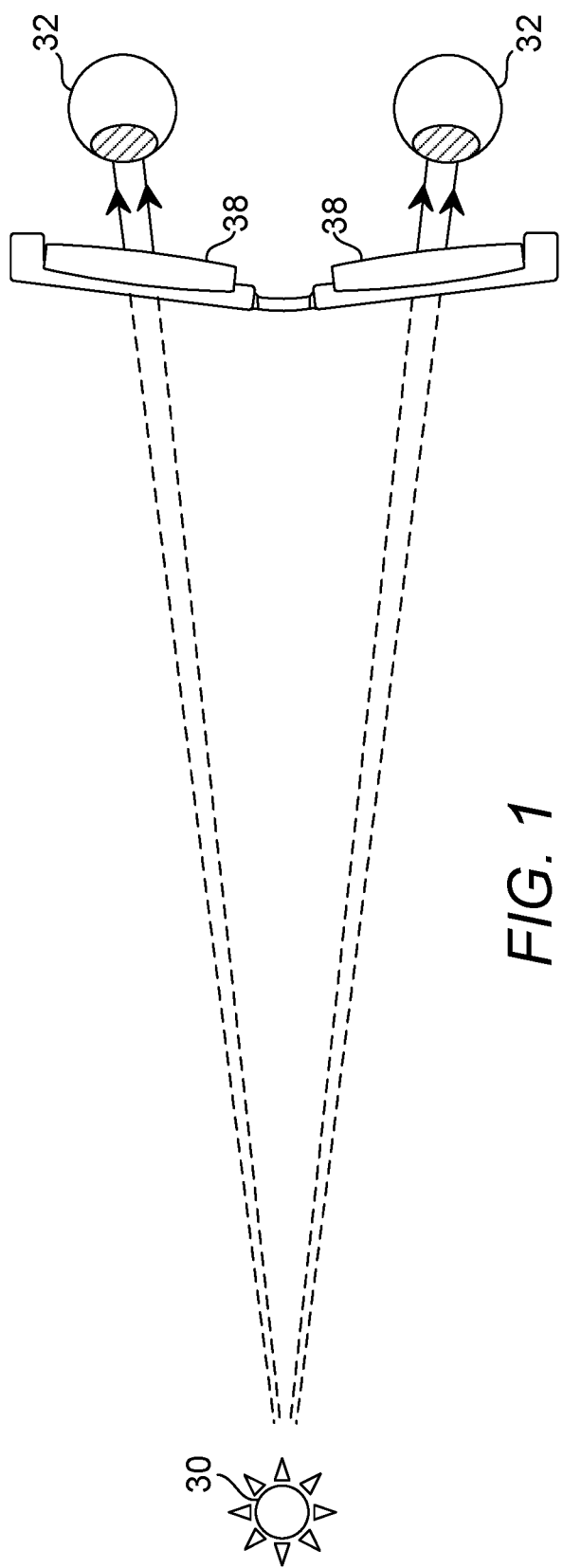
FIG. 1 depicts a scenario where virtual images are projected at a finite distance by an augmented reality (AR) device when an observer perceives optical rays via both eyes.

2—optical system, e.g., periscope or periscope system
4—housing or enclosure
6—pupil or aperture
8—camera or image capture device
10—first mirror
12—secondary or second mirror
14—imaging plane
16—central plane
18—intersection angle of two optical axes
20—device under test (DUT), e.g., exit pupil expansion (EPE) of waveguide
22—light ray coupling-in optics such as holographic grating, metasurface, micro/nano structures or prisms
24—controller
26—first set of light rays
28—second set of light rays
30—distant object
32—human eye
34—optical rays with a specific viewing angle
36—optical rays with another viewing angle
38—lens of extended reality (XR) device
40—reference port, e.g., reference exit port
42—mirror center axis
44—clear aperture
46—plane upon which apertures are disposed
48—radius of curvature of first mirror
50—focal point

PARTICULAR ADVANTAGES OF THE INVENTION

The present periscope enables parallelism tests to be conducted on XR devices, and in particular Exit Pupil Expansion (EPE) devices. The use of a single reflective optical system with two or more entrance pupils ensures the high precision and absolute stability of parallelism measurements, by eliminating any alignment issue or motion errors, e.g., when using a beam splitter to align and combine two channels or when using a motion stage to scan eye boxes. In addition, the diffraction-limited angular resolution offers the highest angular accuracy capable of discerning a slight angular and boresight deviation.

The present periscope enables parallelism tests to be conducted on XR devices as well as enabling measurements to be collected and used for obtaining virtual imaging distances (VIDs) of the XR devices. The present periscope allows lateral offsets to be used for measuring VIDs. Longitudinal offsets are always used in conventional methods including refocusing methods, interference methods or wavefront measurements. VID measurements using conventional methods have been challenging due to the small pupil size in XR devices. However, the use of lateral offsets and axial focal measurements can enhance the accuracy of VID measurements.

As light transmission through the present periscope occurs through reflections using mirrors, no color issues exist. Color issues occur frequently with the use of imperfectly transparent glass due to refractions and reflections. Unlike a refractive lens system, mirrors do not have both lateral and longitudinal chromatic aberrations as well as chromatic focal shifts, which are all critical for RGB or broadband full-color optical measurements.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Depending on the virtual imaging distance projected by an extended reality (XR) device, an observer may perceive optical rays differently via both eyes compared to a single eye. When the XR device projects an object 30 far away or at infinity, optical rays are parallel to each of the two eyes. In this case, one or both eyes perceive optical rays similarly. However, when a projected object is closer to the observer, the two eyes of the observer see optical rays from the object with a vergence angle. In other words, the optical rays are not parallel between the two eyes, as shown in FIG. 1.

Figure 2:
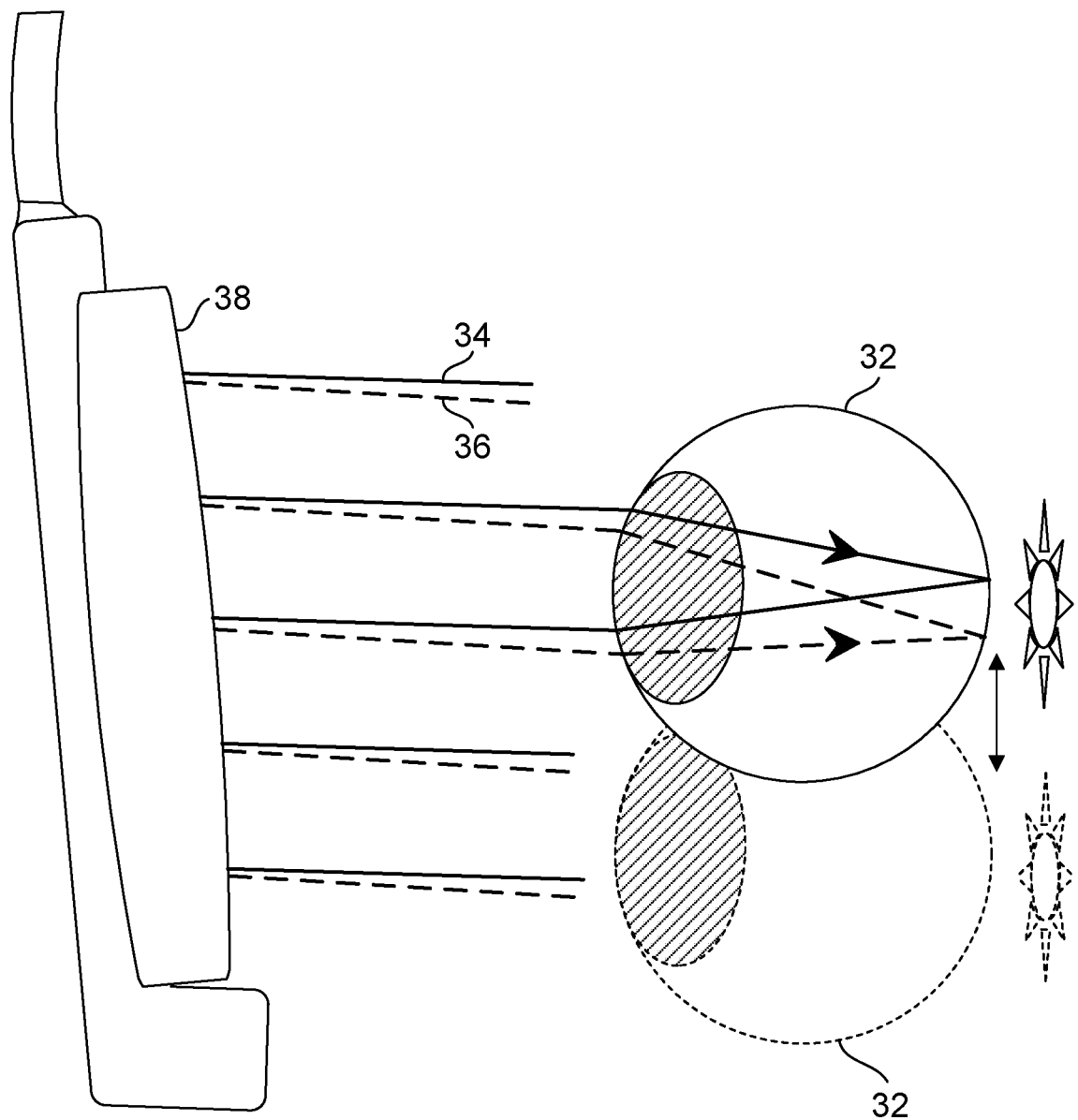
FIG. 2 depicts the parallelism of optical rays being maintained from the same viewing angle due to the exit pupil expansion (EPE) of a light emitter.

Due to the exit pupil expansion (EPE), however, optical rays from the same view angle are parallel within the single eye. For instance, all rays labelled 34 come from the same viewing direction or all rays labelled 36 also come from the same viewing direction as shown in FIG. 2 and each set 34, 36 of rays is parallel to the single eye. FIG. 2 depicts the parallelism of optical rays being maintained from the same viewing angle due to the exit pupil expansion (EPE) of a light emitter, e.g., a lens or a waveguide 38 of an XR device. It shall be noted that only one lens 38 is shown.

Figure 3:
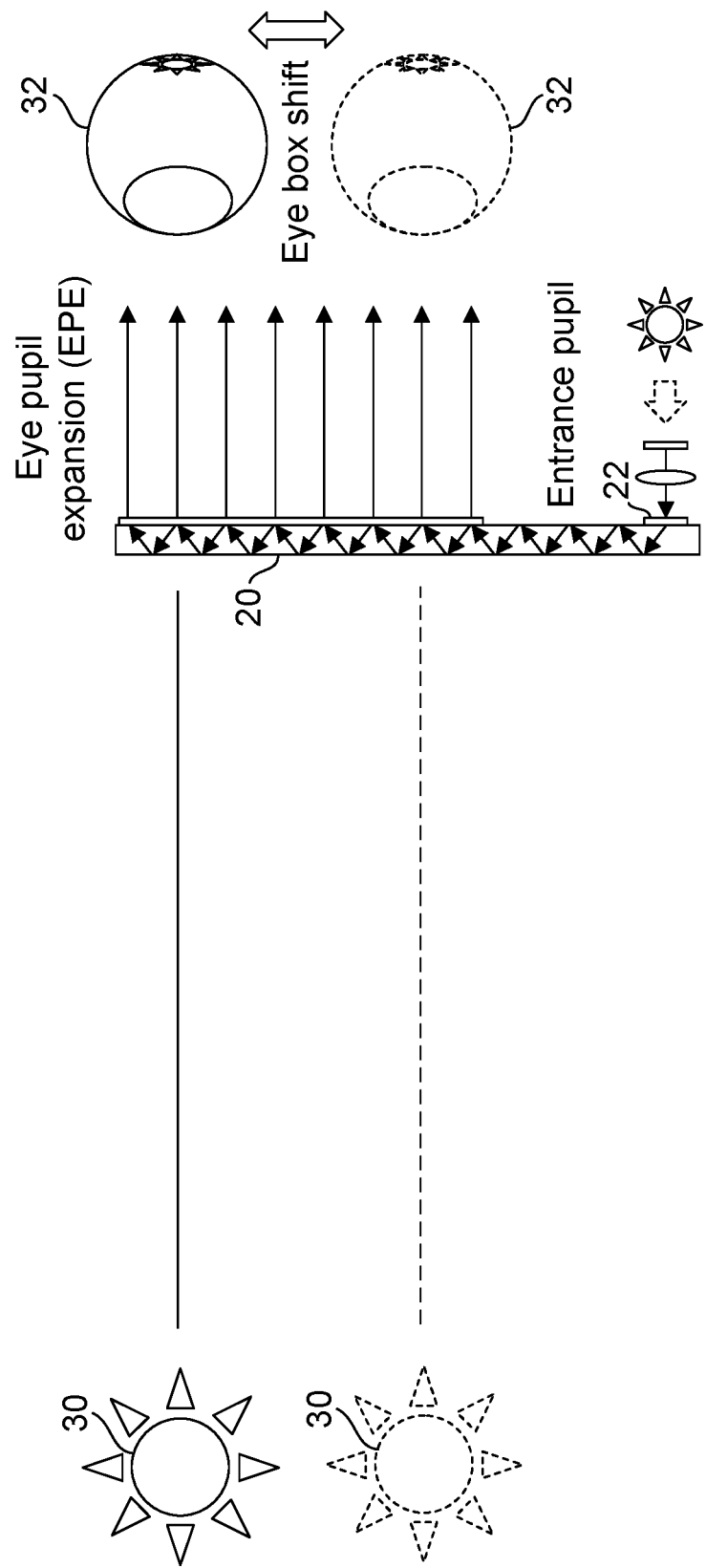
FIG. 3 depicts an eye of an observer which perceives the same virtual image even when the eye box position is slightly offset within the EPE.

FIG. 3 depicts an eye of an observer which perceives the same virtual image even when the eye box position is slightly offset within the EPE. Due to the EPE, the human eye 32 perceives exactly the same object even when the eye box position is slightly offset within the EPE when the human eye 32 moves across the width of the lens 38. The EPE feature is critical in XR technology and applications due to the frequent movements of human eyeballs and head as well as the interpupillary distance (IPD) differences between various people. An entrance port 22 of the waveguide receives light rays or images to be displayed on an EPE of a waveguide 20.

Figure 4:
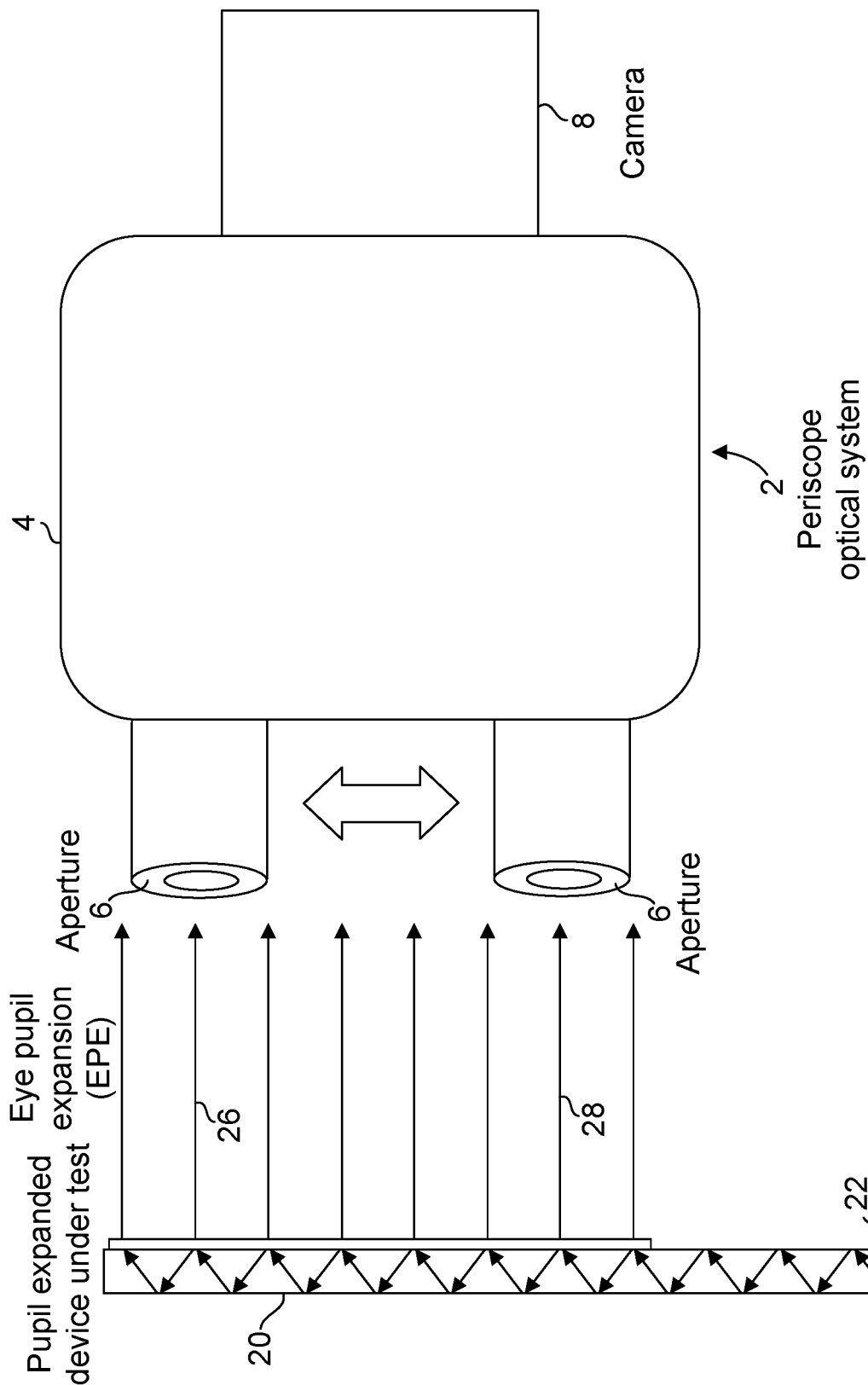
FIG. 4 is a diagram depicting a present reflective optical system useful for measuring and comparing optical rays from different areas of an EPE device.
Figure 5:
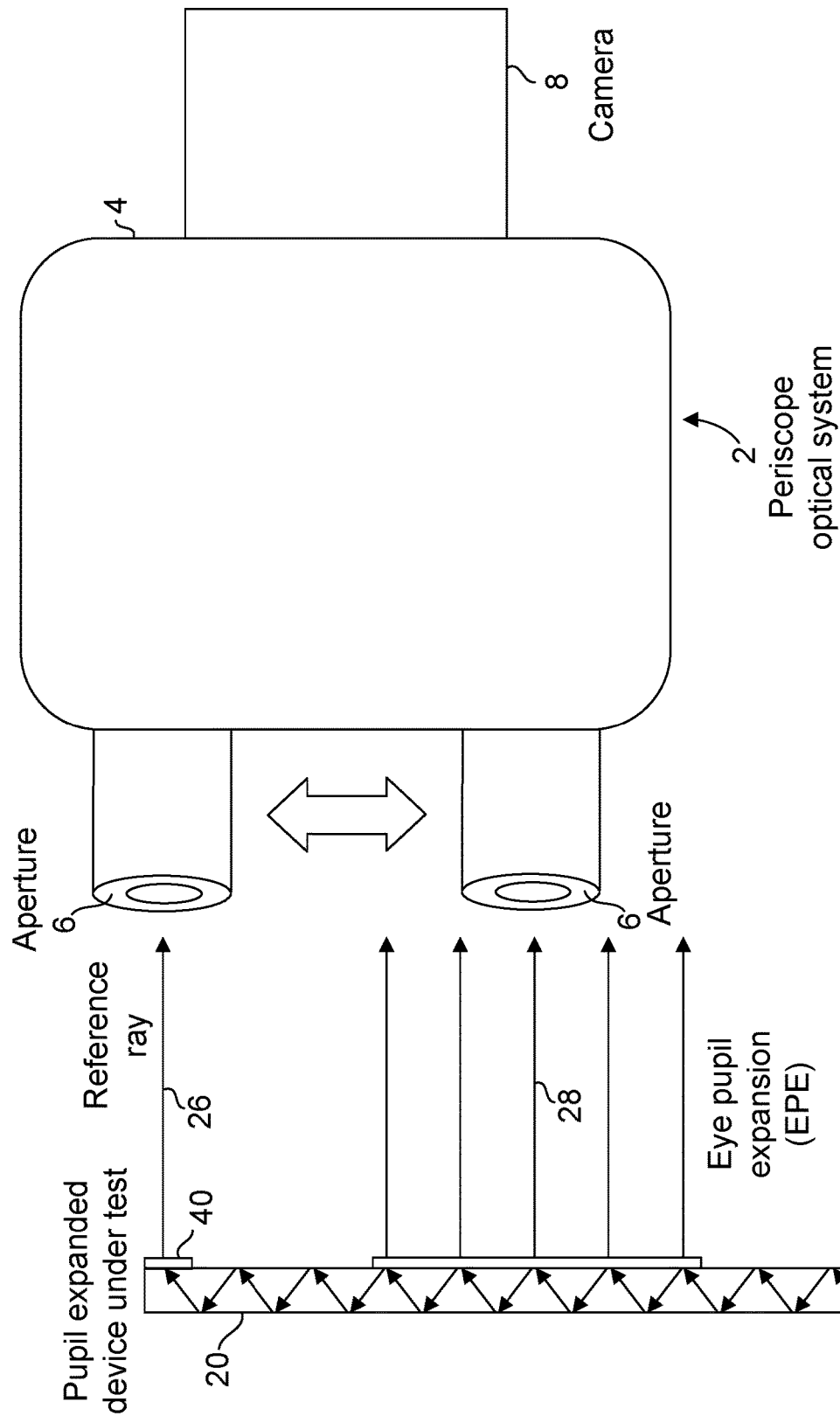
FIG. 5 is a diagram depicting a present reflective optical system useful for measuring and comparing optical rays between the EPE area and a reference exit port.

FIG. 4 is a diagram depicting a present reflective periscope 2 useful for measuring and comparing optical rays from different areas of an EPE device, e.g., a waveguide 20. FIG. 5 is a diagram depicting a present reflective periscope 2 useful for measuring and comparing optical rays between the EPE area and a reference exit port 40. These are two example devices under test (DUTs) or light emitters the present reflective periscope 2 is configured to test, with the apertures 6 of the periscope 2 disposed at a suitable distance, sufficient to receive two sets of light rays 26, 28. To evaluate extended-pupil parallelism, the EPE device is configured to project a parallel beam, which is equivalent to a point image at infinity, or a target pattern such as a crosshair at any virtual imaging distances (VIDs). A periscope or periscope-like optical system can be used to select the optical rays from the EPE device at different areas of interest or different eye box locations and the optical rays are then compared to discern any angular or boresight deviations. Two or more apertures are required to sample the optical rays with adjustable aperture sizes and variable distances between apertures. Ideally, all optical rays are aligned in parallel when the VID is disposed at infinity. In this case, only one spot or crosshair is to be observed on the imaging plane of the periscope sensor. The angular resolution of the periscope is required to be diffraction-limited to ensure the effective detection of any possible misaligned optical rays.

Figure 6:
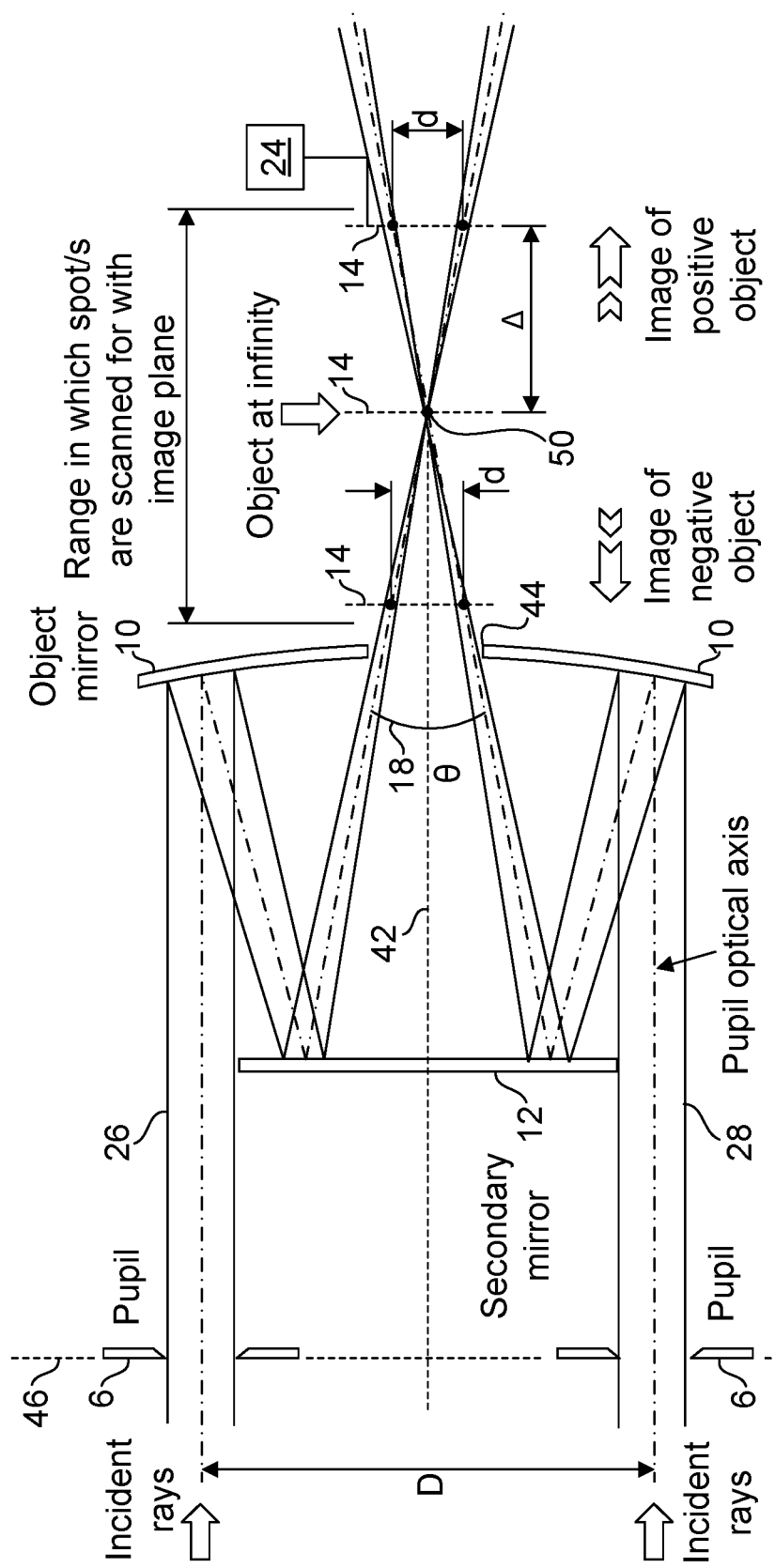
FIG. 6 is a diagram depicting a present reflective optical system based on a present optical system, e.g., a reflective periscope with two or more pupils.
Figure 7:
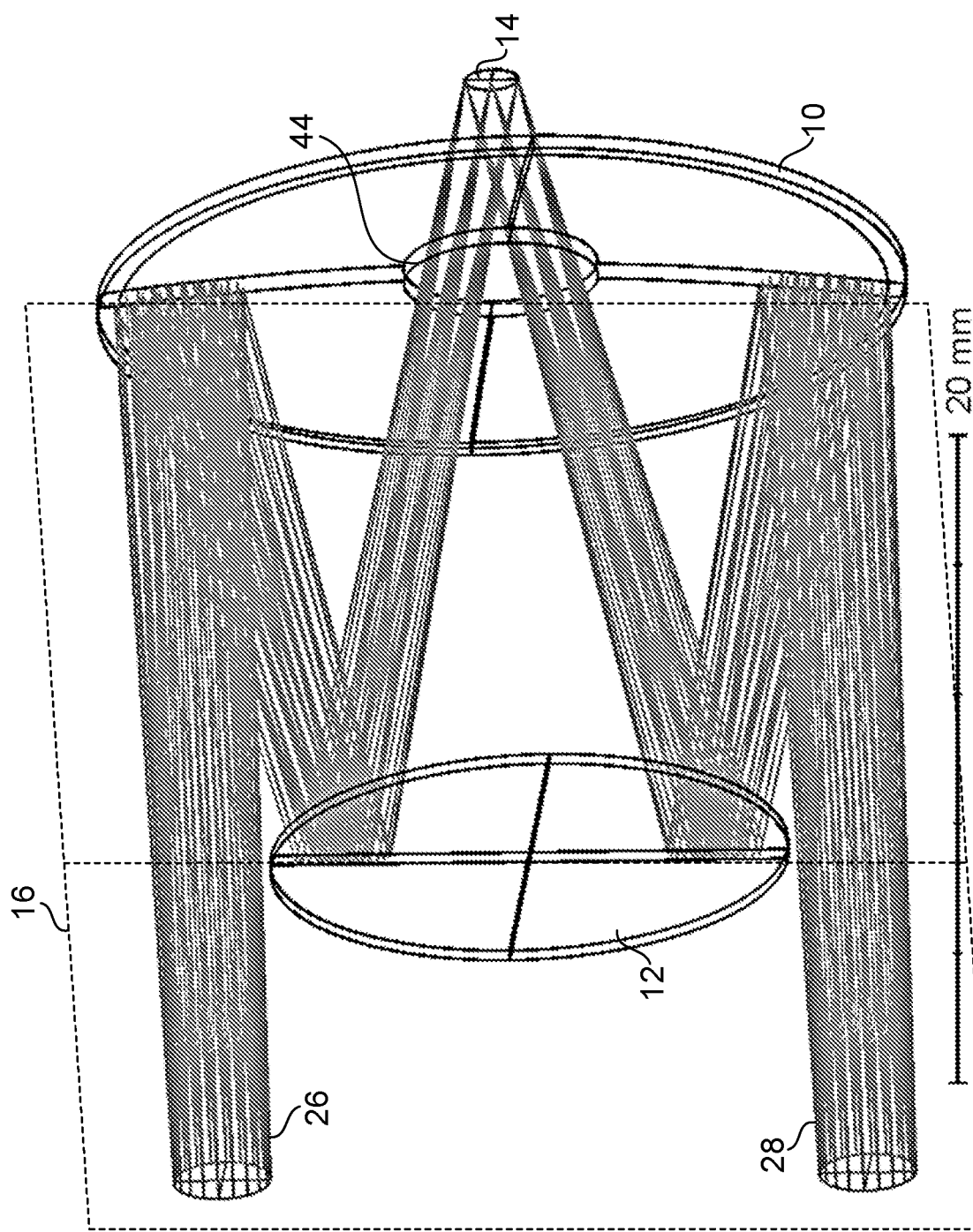
FIG. 7 is a top perspective view of the mirrors of a present reflective optical system with a pair of pupils located within a central plane.
Figure 8:
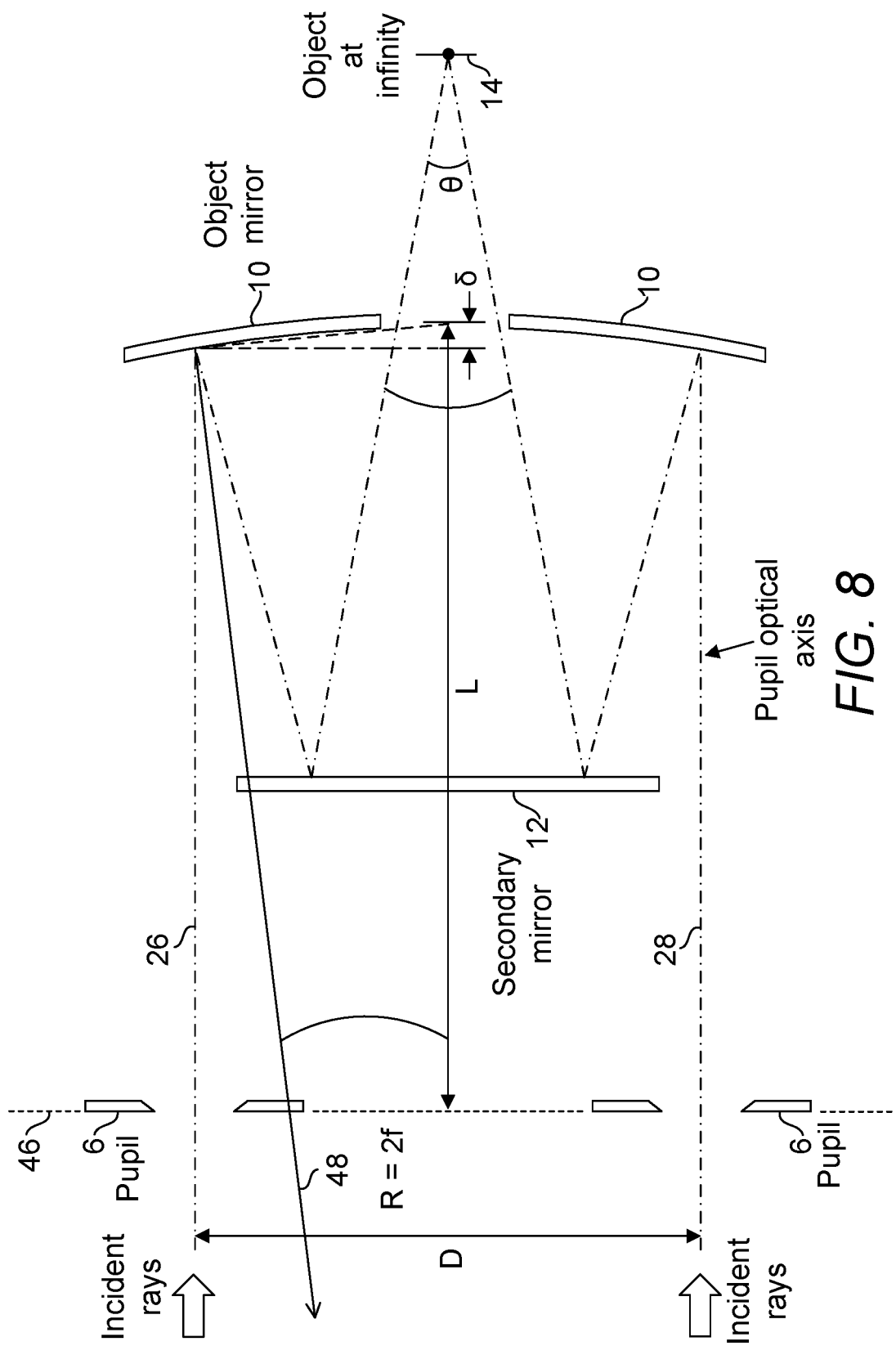
FIG. 8 is a diagram depicting one or more factors considered in determining a VID shorter than infinity and the parallelism between incoming sets of light rays.

FIG. 6 is a diagram depicting a present reflective optical system based on a present optical system, e.g., a reflective periscope with two or more pupils. FIG. 7 is a top perspective view of the mirrors of a present reflective periscope with a pair of pupils located within a central plane 16. It is also possible to have one or more additional apertures or pupils 6 disposed equidistant to mirror center axis 42 as those other pupils 6 to the optical axis along the same plane, i.e., plane 46, on which the pupils 6 are disposed to allow the periscope to be set up for parallelism tests and to allow measurements to be taken for VID determination in cases where there is more than one DUT 20, a DUT with more than two EPE devices or a DUT with more than two sets of rays that are emitted at a time. The periscope 2 or optical system essentially includes an enclosure 4 including a front end and a rear end, a pair of apertures 6 configured to be disposed on the front end of the enclosure 4 on a central plane 16, a pair of first mirrors 10 disposed interior of the enclosure 4, and a second mirror 12 disposed interior of the enclosure 4. A first aperture 6 of the pair of apertures 6 is configured to allow a first set of light rays into the enclosure 4 at a first of the pair of first mirrors 10 before being directed to the second mirror 12 which redirects it to be cast as a first spot on an imaging plane 14. A second aperture 6 of the pair of apertures 6 is configured to allow a second set of light rays into the enclosure 4 at a second of the pair of first mirrors 10 before being directed to the second mirror 12 which redirects it to be cast as a second spot on the imaging plane 14. Each aperture 6 of the pair of apertures 6 is configured to be variable in size, e.g., about 2-5 mm, using, e.g., a diaphragm mechanism, etc. The term "first mirror" is used herein to mean a single first mirror including a clear aperture 44 through which sets of light rays may be redirected as shown in FIG. 7 or an individual portion of a mirror as shown in FIG. 6. Regardless of whether a first mirror 10 is provided as a single mirror or more than one individual portion, the first mirror 10 has a radius R or part 48, as shown in FIG. 8. For ease of alignment however, a single first mirror 10 represents an embodiment which reduces the expenses in which the present optical system can be assembled as the multiple individual first mirrors need not be individually aligned with respect to other components of the optical system. As used throughout herein, a first mirror 10 can be a portion of a larger mirror or it can be an individual portion not directly connected with a second portion but otherwise optically aligned with a second portion such that the individual portions share a common center and radius R. In one embodiment, each first mirror 4 includes a radius of about 200-400 mm, i.e., dimensions Applicant found to be suitable for XR applications. Each of the first mirrors 10 is a concave mirror. In one embodiment, the concaved surface of the first mirror 10 is a conic surface. The second mirror 12 is a plane mirror although it can be a concave mirror or a convex mirror.

Referring back to FIG. 6, the intersection angle 18 or θ, of two optical axes is defined as follows:

$$\theta = 2 \arcsin(D/(2f)). \quad \text{Equation (1):}$$

Here, D is the distance between two pupil centers and f is the focal length of the reflective periscope 2. Since each pupil 6 is offset from the mirror center axis 42, an object will be imaged along the pupil axis, i.e., a dot dash line, rather than the mirror center axis 42. For an object at infinity, the optical rays are parallel and they will be focused to the same focal point 50 of the periscope 2 regardless of pupil location. For a positive or negative object with a certain object distance or a VID, the images are laterally separated when optical rays pass through different pupils. Assuming d is the separation distance between two imaging centers through different pupils for the same object distance, d can be defined as follows:

$$d = 2\Delta \tan(\theta/2). \quad \text{Equation (2):}$$

Here, Δ is the offset of an imaging plane 14 from the mirror focus position which intersects the focal point 50 when the object is not at infinity. In one embodiment, the imaging plane 14 is an imaging plane of an image capture device 8, e.g., a camera. In one embodiment, a controller 24 is functionally connected to a linear stage or another suitable positioner configured to manage the positioning of the imaging plane 14 and to position the imaging plane 14 at a location along mirror center axis 42 either manually or automatically. Based on imaging principles, Δ or an offset of the imaging plane 14 from the focus position of a first mirror 4 when the light emitter or DUT is not optically disposed at infinity, can be resolved as follows:

$$\Delta = ((VID \cdot f)/(VID - f)) - f = f^2/(VID - f) \quad \text{Equation (3):}$$

The term f is the focal length of the periscope. Therefore, in addition to parallelism measurements, a VID can be resolved using the present optical system based on either a lateral or axial offset of the image center or VID can be resolved as follows:

$$VID = (f \cdot (f + \Delta))/\Delta. \quad \text{Equation (4):}$$

Based on Equation (4), it shall be seen that VID is a function of Δ and thus d. FIG. 8 is a diagram depicting one or more factors considered in determining a VID shorter than infinity and the parallelism between incoming sets of light rays. For a long VID such as infinity, the above equation yields an accurate result. For shorter VIDs, the distance from a pupil location to the mirror surface is required to be considered, i.e., the quantity L−δ. Here, L is the distance between pupil plane to the mirror center, δ is an offset from the mirror surface towards the pupil plane 48 as follows:

$$\delta = 2f(1 - \cos(\theta/4)). \quad \text{Equation (5):}$$

So, the VID is required to be corrected as follows where VID' represents the correct VID:

$$VID' = VID - [L - 2f(1 - \cos(\theta/4))]; \quad \text{Equation (6):}$$

where R is a radius of the first mirror 4.

Figure 9:
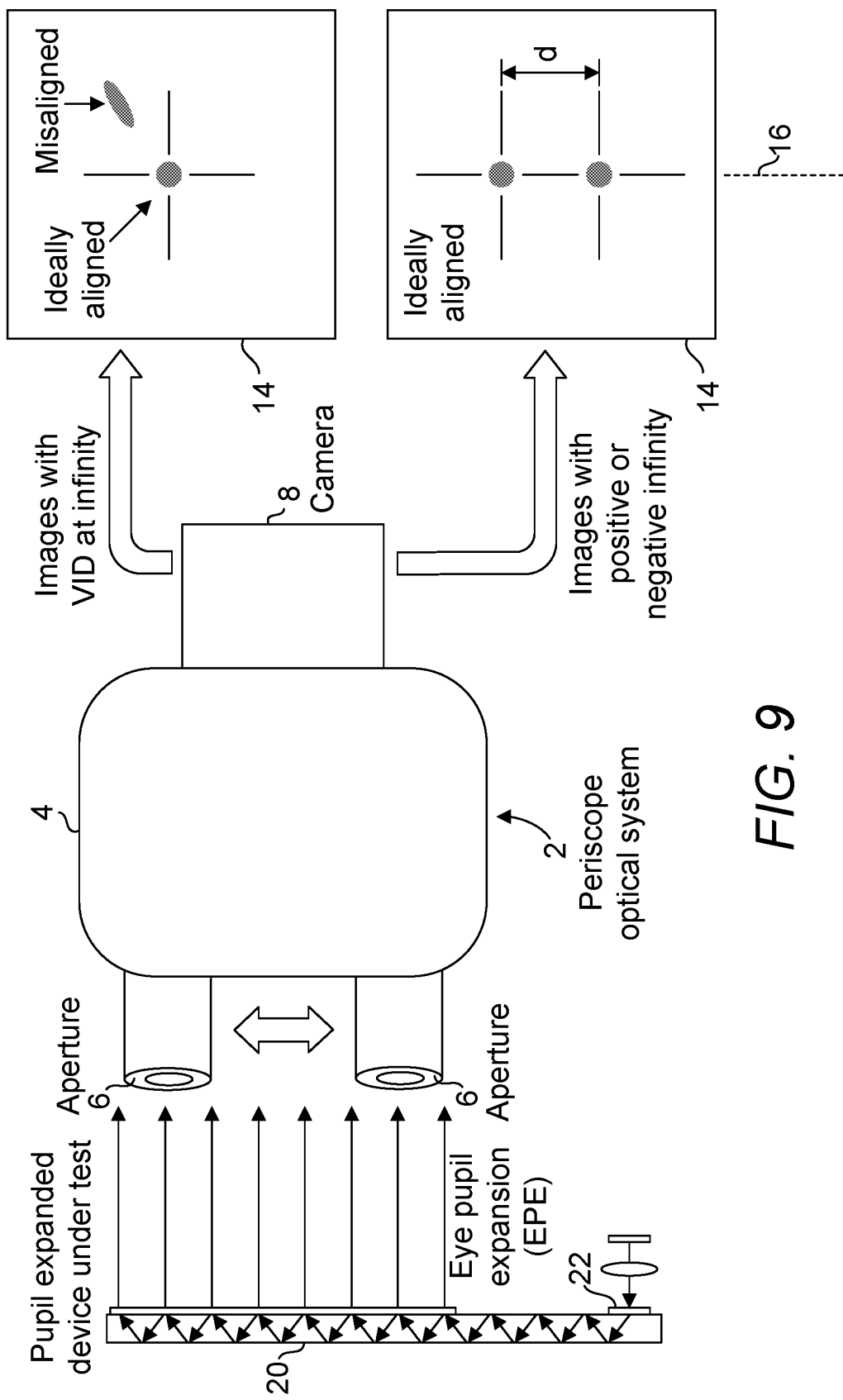
FIG. 9 is a diagram depicting a present optical system useful for determining the parallelism of incoming sets of light rays and the VID of the device under test (DUT) from which the incoming sets of light rays are emitted.
Figure 10:
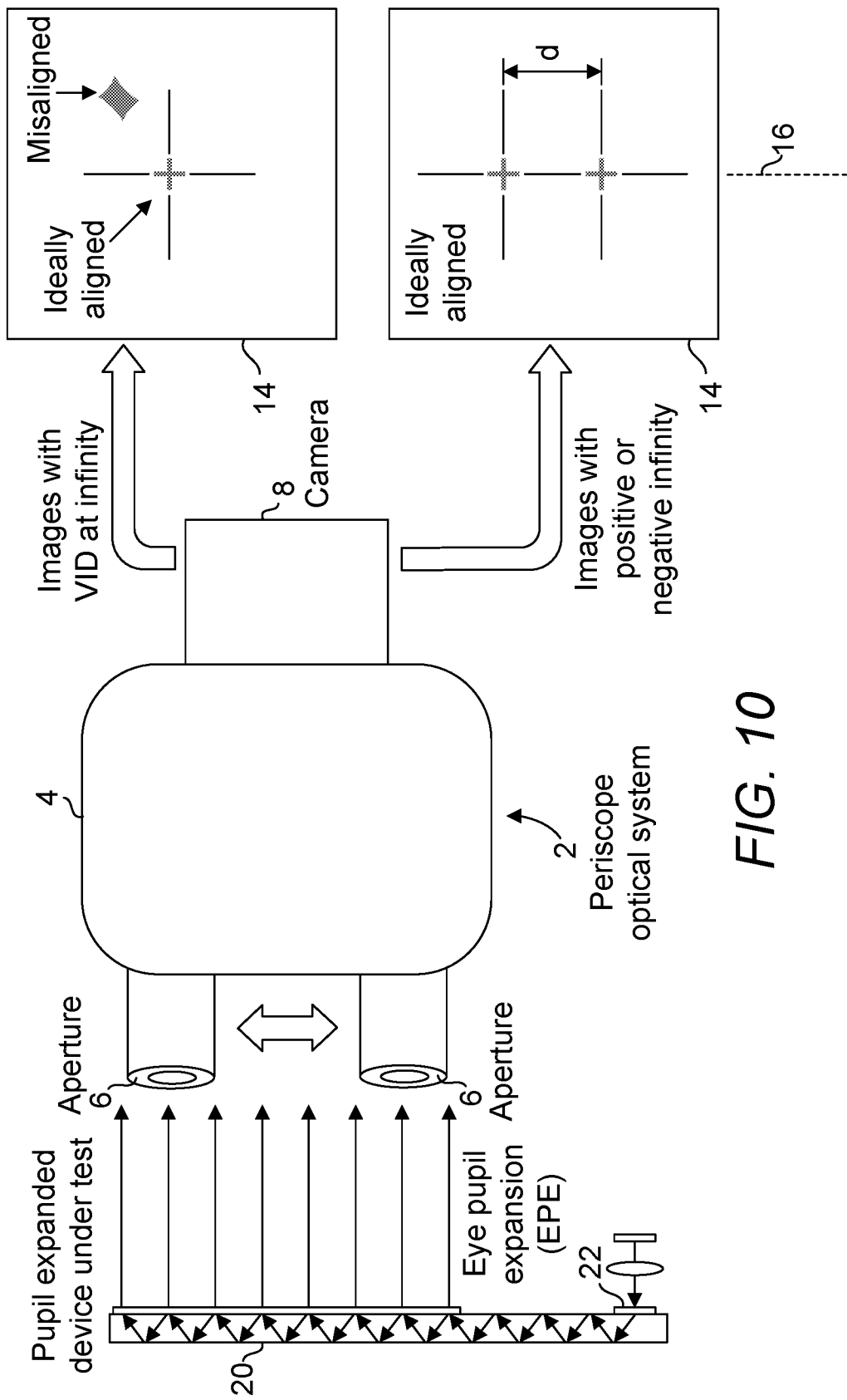
FIG. 10 is a diagram depicting a present optical system useful for determining the parallelism of incoming sets of light rays and the VID of the DUT from which the incoming sets of light rays are emitted.

FIG. 9 is a diagram depicting a present optical system useful for determining the parallelism of incoming sets of light rays and the VID of the DUT from which the incoming sets of light rays are emitted. The EPE device is configured to project a point image or a collimating light through each aperture of the present optical system 2. FIG. 10 is a diagram depicting a present optical system useful for determining the parallelism of incoming sets of light rays and the VID of the DUT from which the incoming sets of light rays are emitted. Here, again, the DUT is an EPE device and it is configured to project a crosshair object pattern for ease of angular measurements. Other patterns can also be used as long as the patterns indicate some form of orientation. An orientation-indicating pattern, e.g., a crosshair, can provide additional measurement information such as rotation misalignment where the crosshairs, each exhibited by a set of light rays, can be determined to be angularly rotated with respect the central plane 16 or the other crosshair. The crosshairs or another pattern, e.g., checkerboard pattern, can also be used to measure the point spread function (PSF) or modulation transfer function (MTF) as well as contrast ratio (CR), which are all important in determining the optical quality of the EPE devices. Referring back to FIG. 6 as well as FIGS. 9 and 10, it shall be seen that various images may be cast on the imaging plane 14. In one embodiment, the image capture device 8 includes a controller 24 configured to receive an image of the first spot and the second spot. FIG. 9 shows the use of circular spots. The top right image depicts two sets of light rays that are not parallel as one of the spots is disposed to the upper right of a plane corresponding to the central plane 16 and the spot appears obscured or not round. The bottom right image depicts two sets of light rays that are parallel to one another as both of the spots are disposed along a plane that corresponds to the central plane 16 and the spots appear round and spread apart a distance d. FIG. 10 shows the use of crosshairs. Again, the top right image depicts two sets of light rays that are not parallel as one of the spots is disposed to the upper right of a plane corresponding to the central plane 16 and the spot appears obscured or an image of a distorted crosshair. The bottom right image depicts two sets of light rays that are parallel to one another as both of the spots are disposed along a plane that corresponds to the central plane 16 and the spots appear as crosshairs and spread apart a distance d. If at least one of the first spot and the second spot is not disposed on the central plane 16 or a plane corresponding to the central plane 16, the first set of light rays and the second set of light rays are determined to not be disposed parallel to one another. In a present optical system 2, as the parameters of the components and their locations are known, for every d, i.e., the distance between the first spot and the second spot, there is a corresponding value for D, i.e., the distance between the first set of light rays and the second set of light rays. The parameters d and D are related through Equations (1) and (2). For a D value, there can be multiple d values. Given a d value, a D value can be computed. As the D value is fixed, i.e., the distance between the center of the first set of light rays and the center of the second set of light rays, a computed D value which deviates from the fixed value is deemed to occur when d does not correspond with D. Therefore, if d does not correspond or agree with D, the first set of light rays and the second set of light rays are said to not be disposed parallel to one another. In one embodiment, the controller 24 is configured to determine if the first spot and the second spot are disposed on a central plane 16 of the optical system 2 and if a distance between the first spot and the second spot or d corresponds with a distance between the first set of light rays and the second set of light rays or D. A spot may be detected when an image captured by the image capture device 8 is scanned for a round feature as in FIG. 9 or a crosshair feature as in FIG. 10. This determination may also be performed manually by a technician who adjusts, determines and selects the position of the imaging plane 14 at which the sharpest spots may be obtained. As disclosed elsewhere herein, the selection of the position along the mirror center axis 42 at which spot images are obtained for parallelism and/or VID determination may be performed manually or automatically. If automatic positioning of the imaging plane 14 is desired, the spots are scanned automatically along the mirror center axis 42 for when they form the clearest or sharpest spots on the imaging plane 14 before an image at this position is obtained for further determination of parallelism between the sets of rays and/or the VID.

Figure 11:
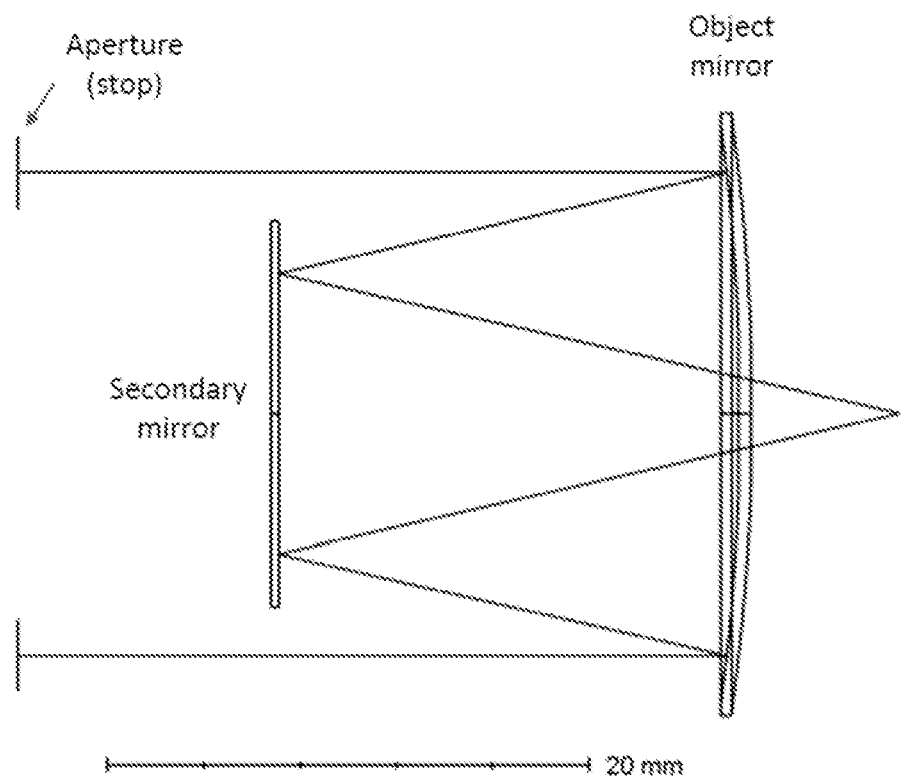
FIG. 11 is a diagram depicting the optical design data for the present optical system.

FIG. 11 is a diagram depicting the optical design data for the present optical system. The optical design includes two main reflective surfaces, one is a first mirror which is an object mirror, and the other is a secondary or second mirror. There are two apertures or stops where optical rays are sampled for measurements.

Figure 12:
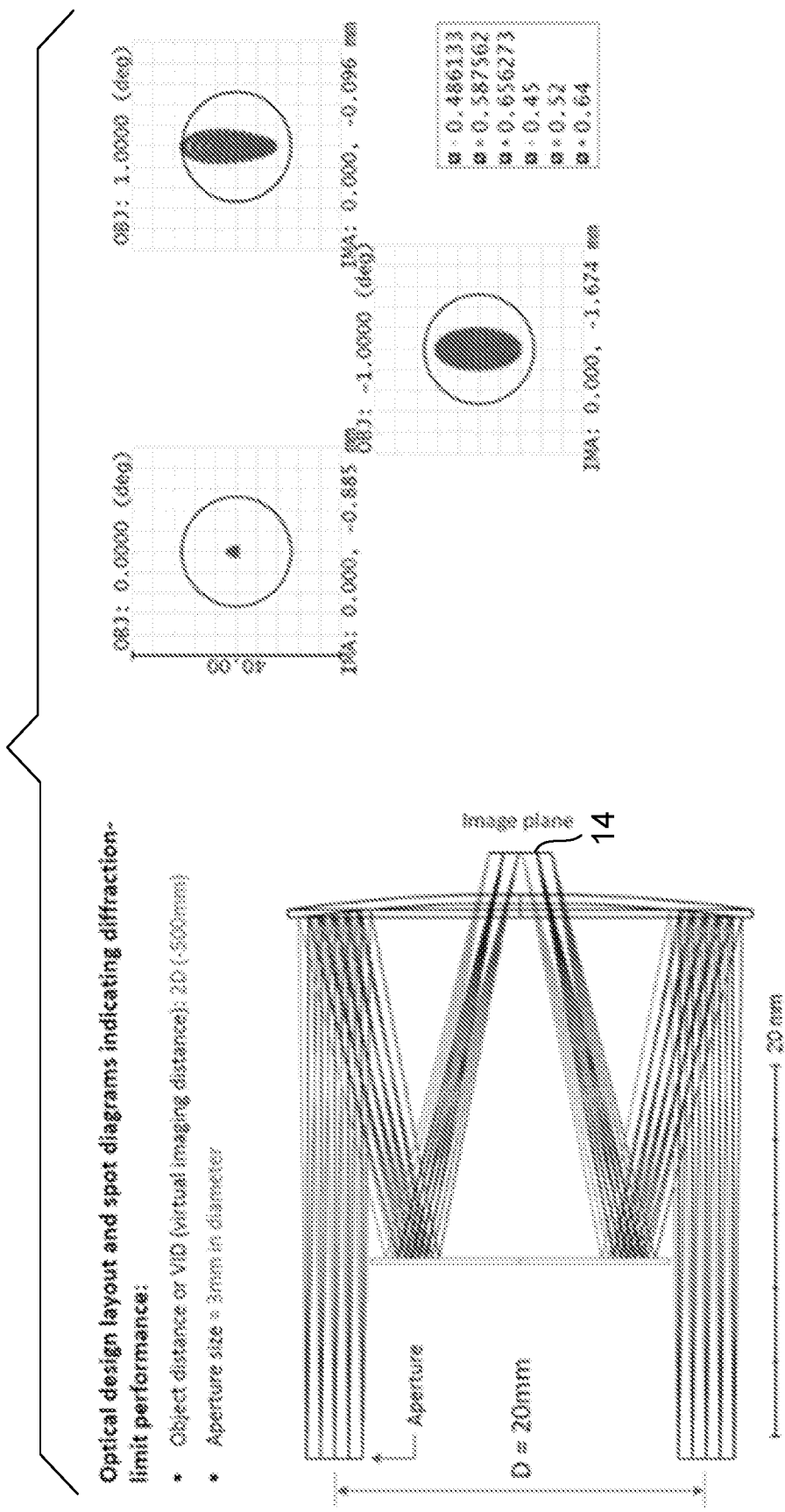
FIG. 12 is a diagram depicting spot diagrams with Airy disc (black circles) indicating diffraction-limit performance at D=20 mm, VID=2D and aperture=3 mm in diameter, of a present optical system.
Figure 13:
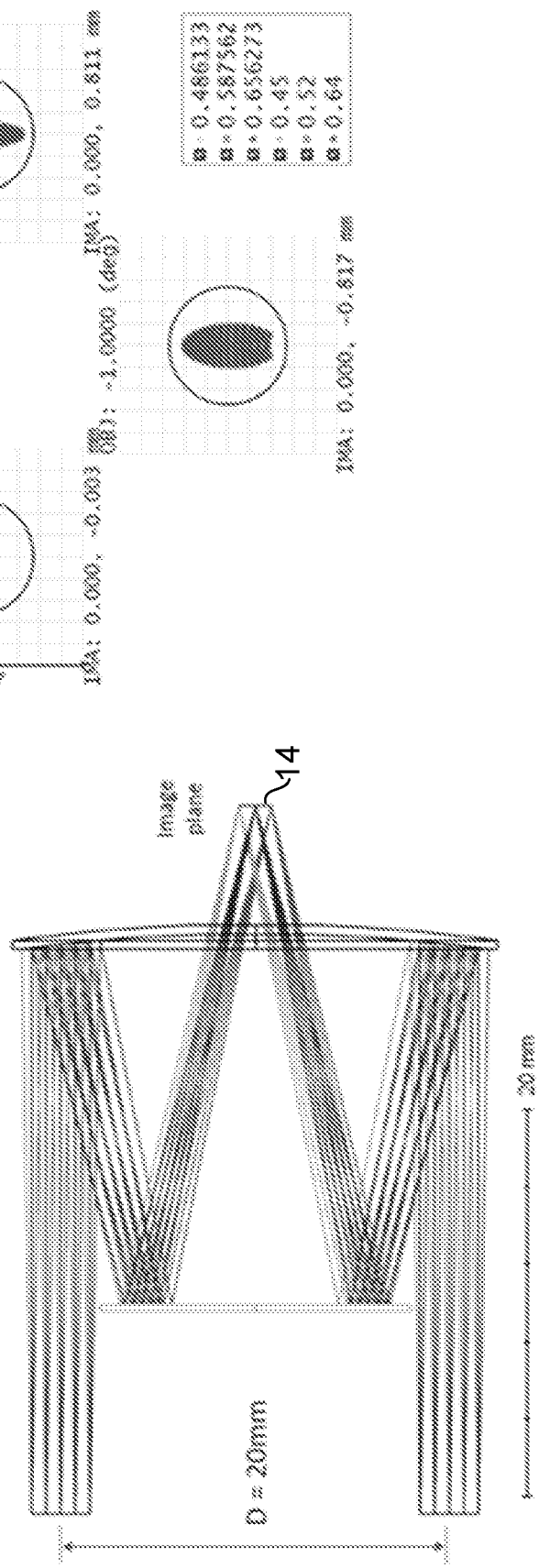
FIG. 13 is a diagram depicting spot diagrams with Airy disc (black circles) indicating diffraction-limit performance at D=20 mm, VID=0D and aperture=3 mm in diameter, of a present optical system.
Figure 14:
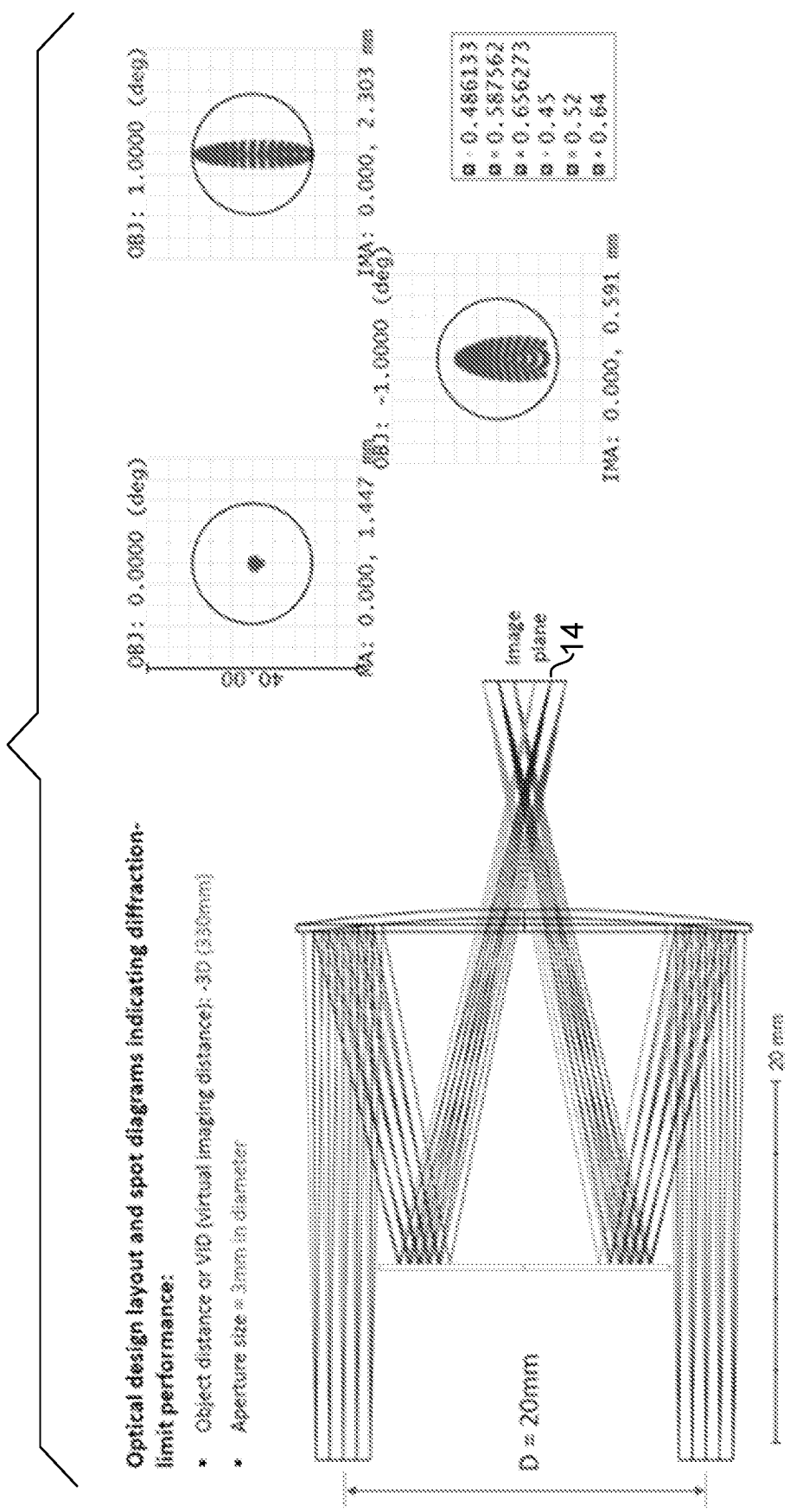
FIG. 14 is a diagram depicting spot diagrams with Airy disc (black circles) indicating diffraction-limit performance at D=20 mm, VID=−3D and aperture=3 mm in diameter, of a present optical system.

FIG. 12 is a diagram depicting spot diagrams with Airy disc (black circles) indicating diffraction-limit performance at D=20 mm, VID=2D and aperture=3 mm in diameter, of the present optical system. FIG. 13 is a diagram depicting spot diagrams with Airy disc (black circles) indicating diffraction-limit performance at D=20 mm, VID=0D and aperture=3 mm in diameter, of the present optical system. FIG. 14 is a diagram depicting spot diagrams with Airy disc (black circles) indicating diffraction-limit performance at D=20 mm, VID=−3D and aperture=3 mm in diameter, of a present optical system. The VID can range from −10D to +3D for 3-mm apertures. The VID can be extended to −50D and to +3D if a smaller aperture, e.g., 1-mm aperture is used.

Figure 15:
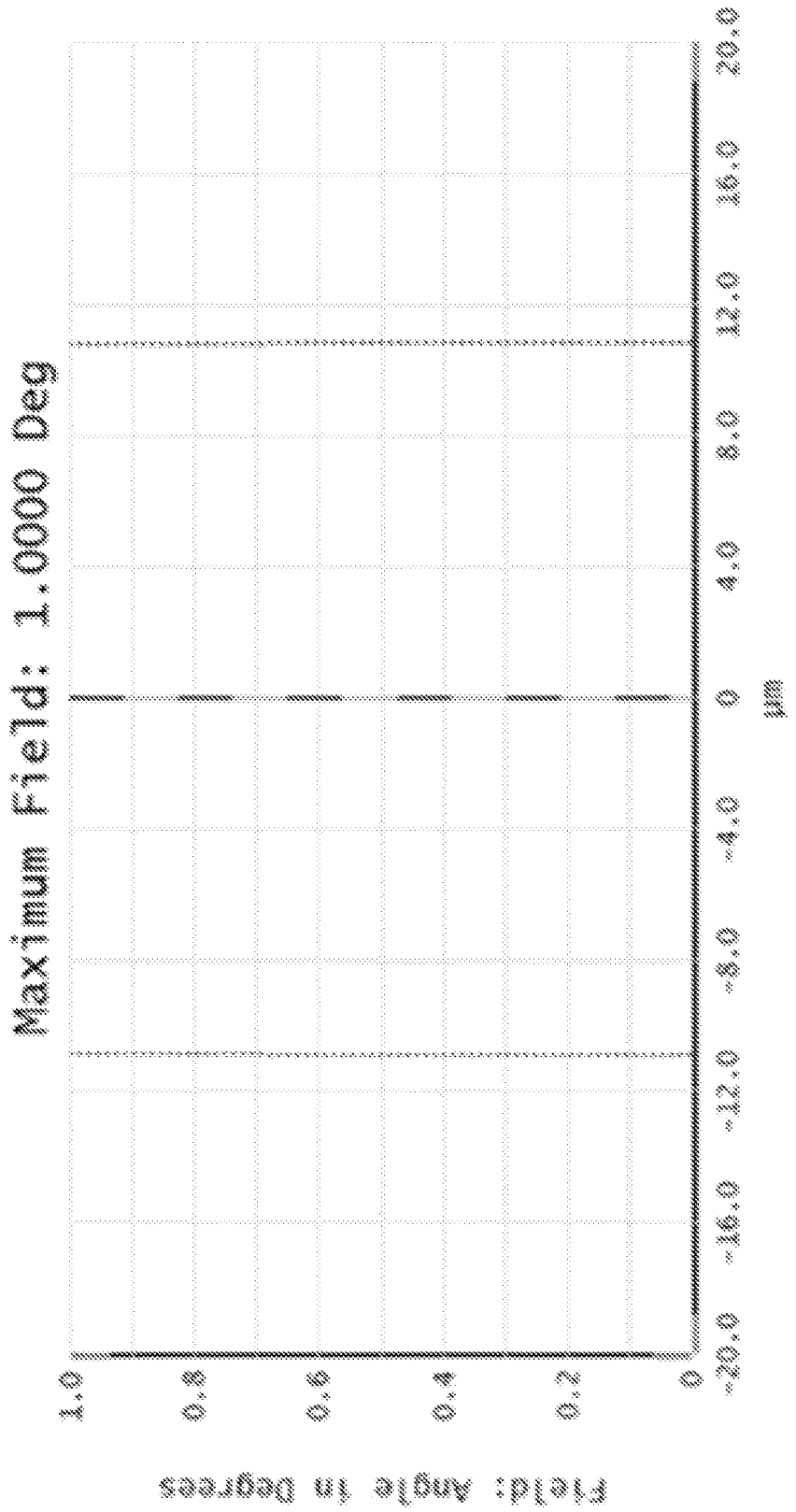
FIG. 15 is a diagram depicting the lateral color of the present reflective optical system, indicating that the reflective optical system does not incur chromatic aberrations.

FIG. 15 is a diagram depicting the lateral color of the present reflective optical system, indicating that the reflective optical system does not incur chromatic aberrations. Mirrors do not cause chromatic aberrations and function well for RGB or broadband full-color parallelism measurements.

Figure 16:
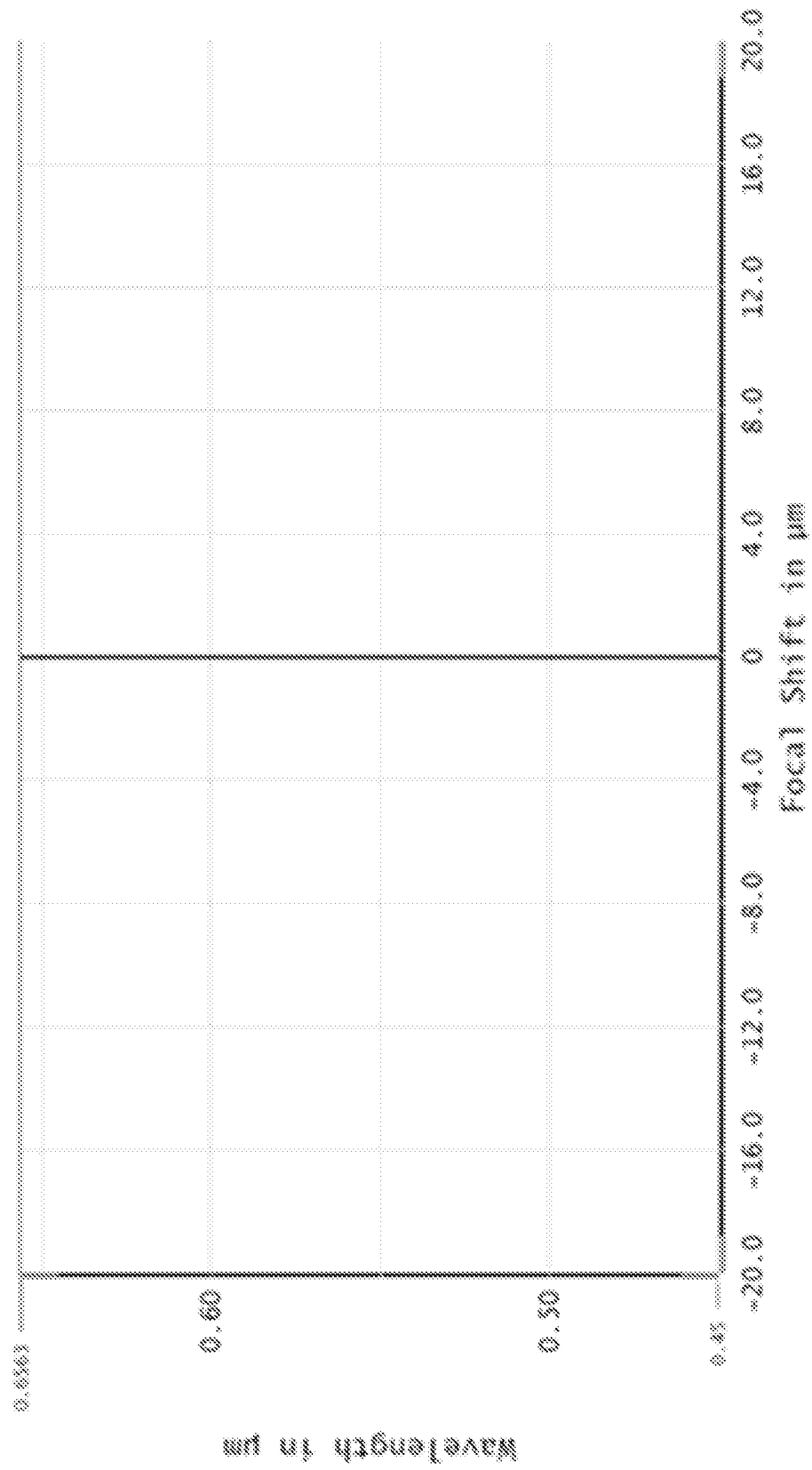
FIG. 16 is a diagram depicting the chromatic focal shift of the present reflective optical system, indicating that the reflective optical system does not incur chromatic focal shifts.

FIG. 16 is a diagram depicting the chromatic focal shift of the present reflective optical system, indicating that the reflective optical system does not incur chromatic focal shifts. Mirrors do not cause chromatic focal shifts and function well for RGB or broadband full-color parallelism measurements.

Figure 17:
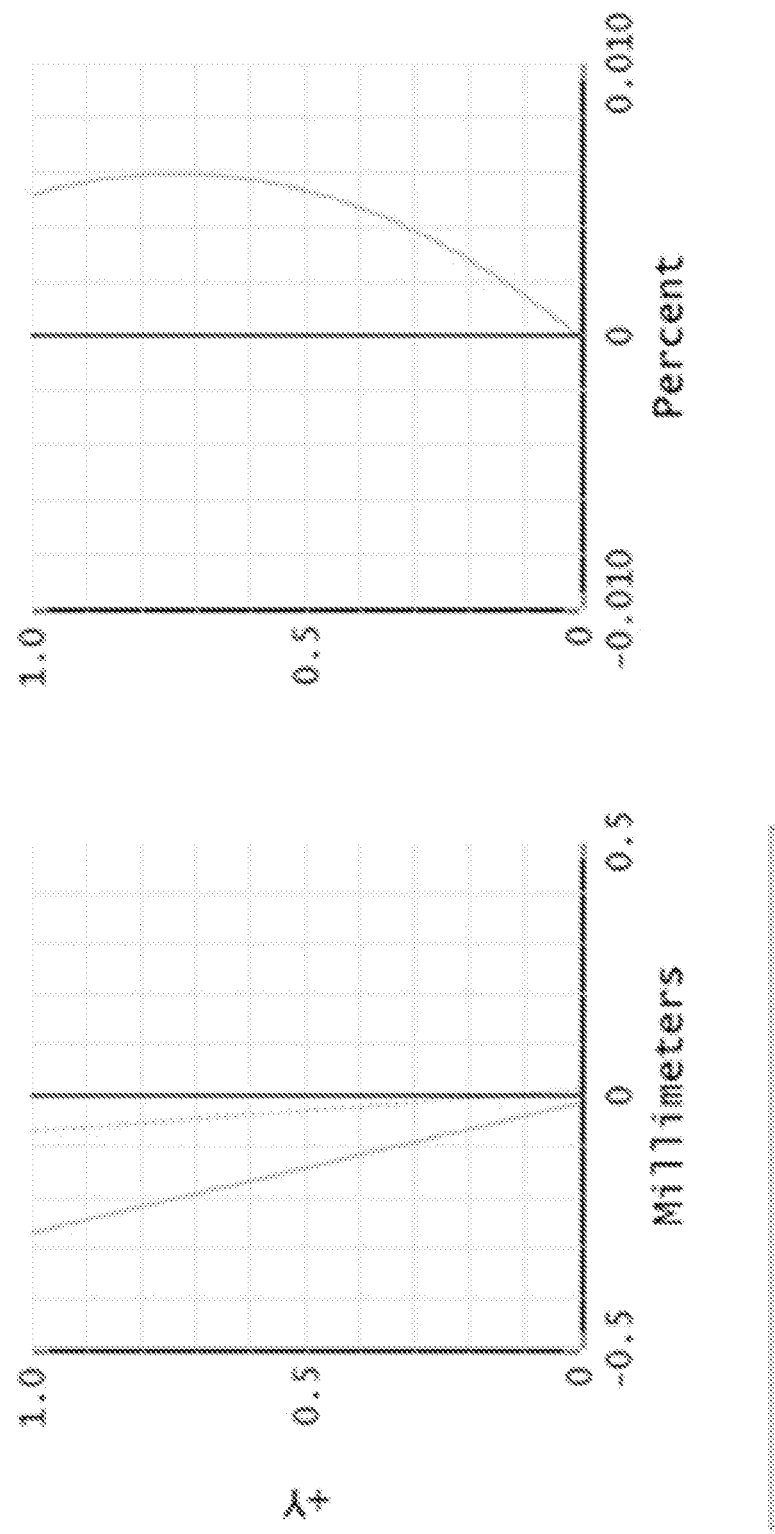
FIG. 17 is a diagram depicting the field curve and distortion of the present reflective optical system.

FIG. 17 is a diagram depicting the field curve and distortion of the present reflective optical system. It shall be noted that the distortion was found to be extremely small.

Figure 18:
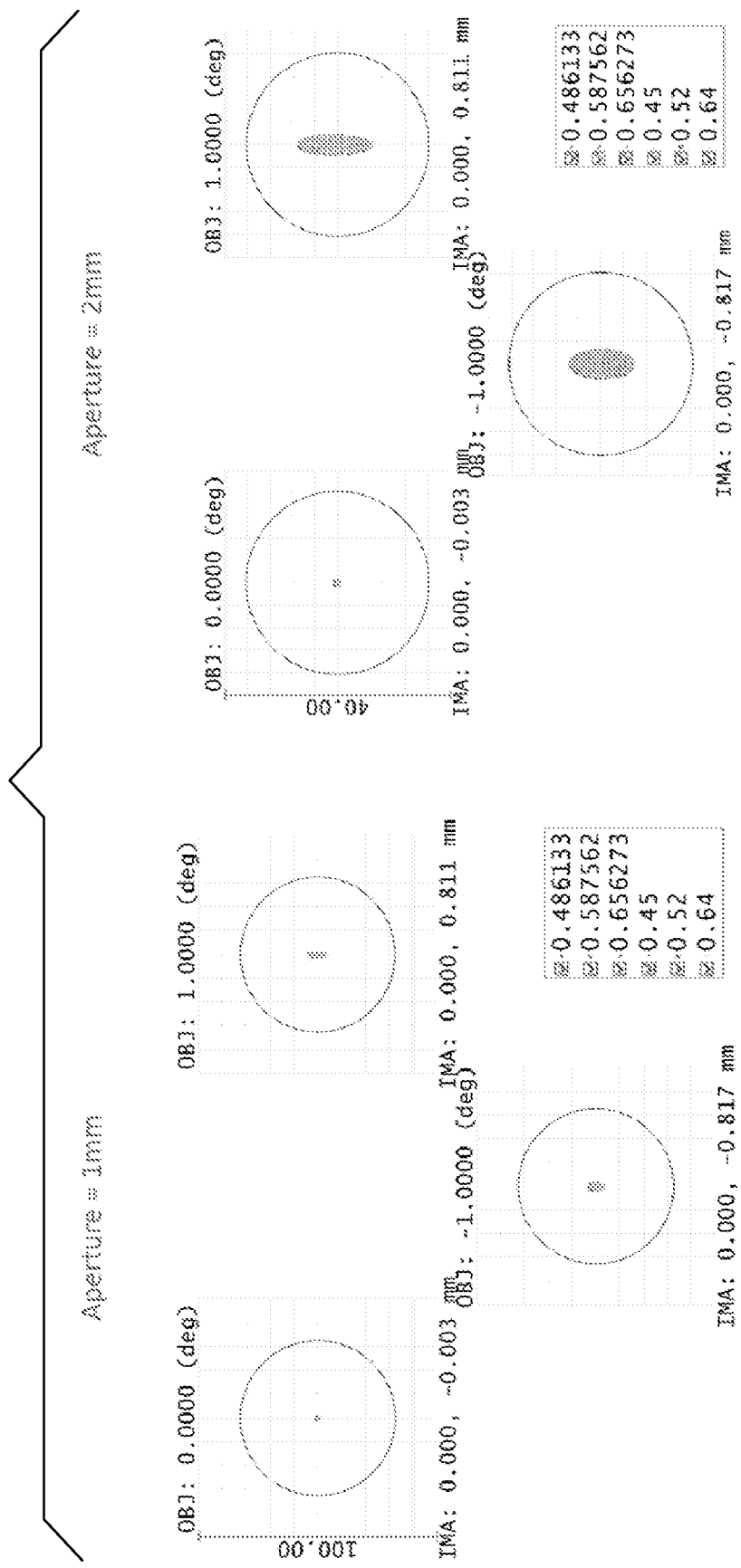
FIG. 18 is a diagram depicting spot diagrams of the present reflective optical system with the object distance or VID at infinity under aperture sizes of 1 mm and 2 mm.

FIG. 18 is a diagram depicting spot diagrams of the present reflective optical system with the object distance or VID at infinity under aperture sizes of 1 mm and 2 mm. FIG. 19 is a diagram depicting spot diagrams of the present reflective optical system with the object distance or VID at infinity under aperture sizes of 3 mm and 4 mm. It shall be noted that the diffraction-limited performance under the various aperture sizes is important for XR metrology, to match the variable pupil sizes of human eyes.

FIG. 20 is a table summarizing various parameters under which the performance of the present reflective optical system remains diffraction-limited. It shall be noted that the VID number sign in diopter is reversed compared to mm, since it is convenient to do so, for calculations associated with measurements of DUTs with additional prescriptions or corrective lenses. At VID=−330 mm, the imaging plane is close to the object mirror, so it limits a negative VID range which can be easily extended to, e.g., −100 mm, by reducing the distance between the second mirror to the object or first mirror. In addition to the diffraction-limited angular resolution, the optical system also has diffraction-limited MTF performance under various apertures, e.g., from 2 mm to 5 mm, matching a human eye pupil size and across the long range of VIDs from at least +/−6D to infinity. The 3-mm aperture matches a human eye pupil size and it is the most used value for various measurements in VR metrology. Therefore, the periscope can be used for MTF measurements in addition to parallelism measurements.

Figure 21:
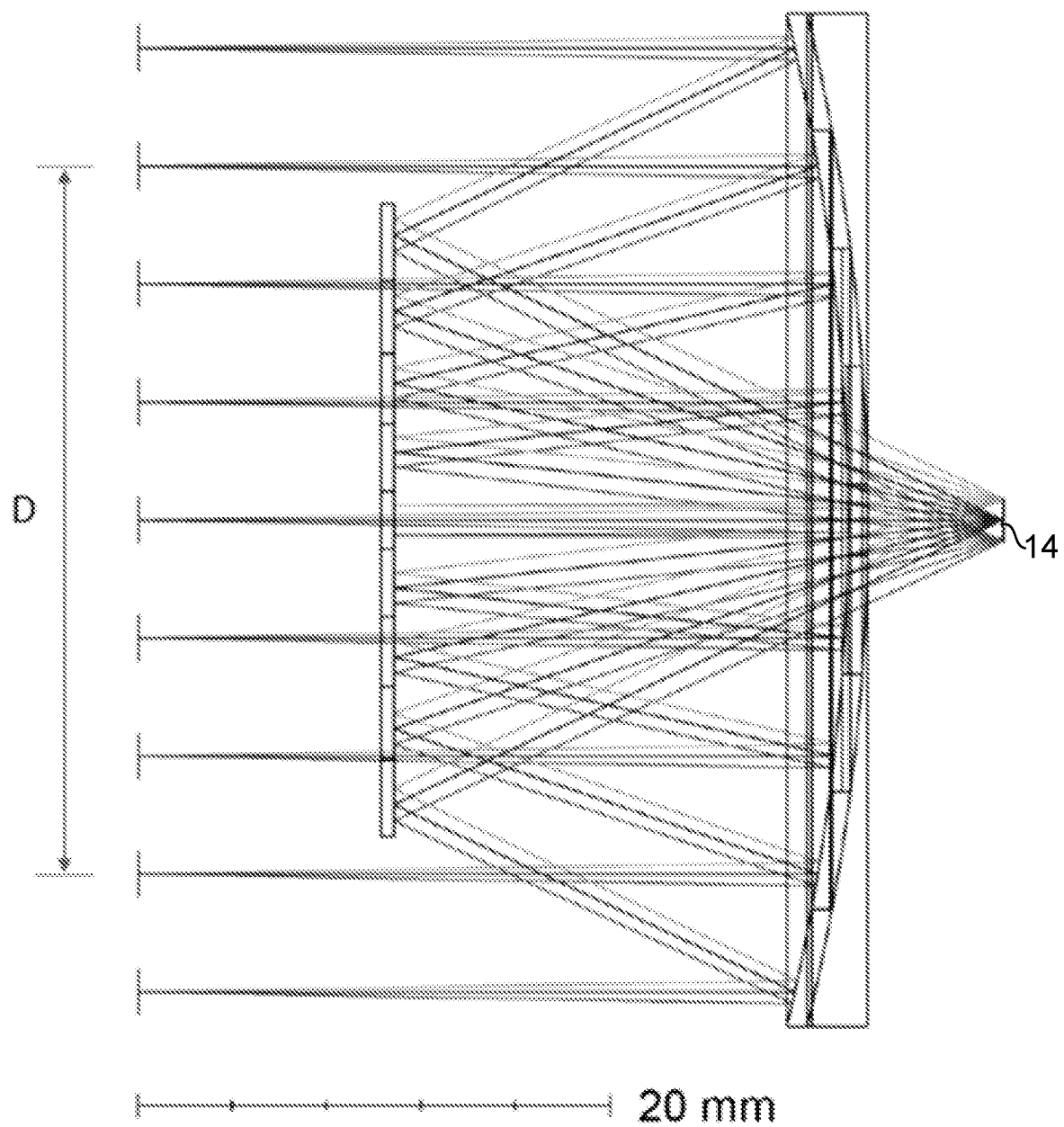
FIG. 21 depicts an optical layout with variable aperture distances.

FIG. 21 depicts an optical layout with variable aperture distances. It shall be noted that the diameter of the second mirror can be changed or alternatively the second mirror can be a beam splitter so that the incident rays can propagate to the object mirror or the first mirror. Then, the reflected optical rays are reflected again by the second mirror or the beam splitter to the sensor.

Figure 22:
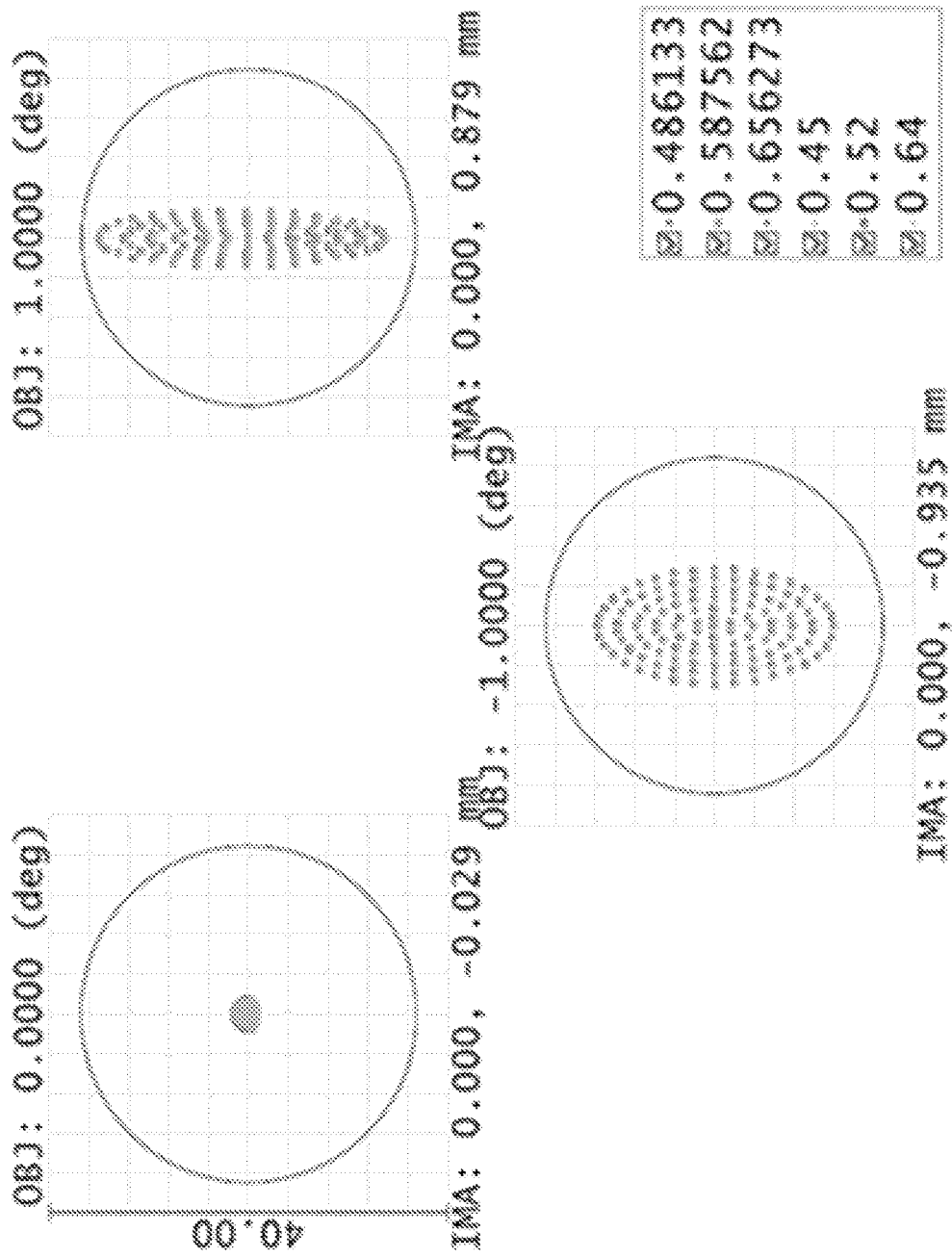
FIG. 22 is a spot diagram of the present reflective optical system with an aperture distance D=40 mm under an object distance or a VID at infinity and an aperture of 2 mm in diameter.
Figure 23:
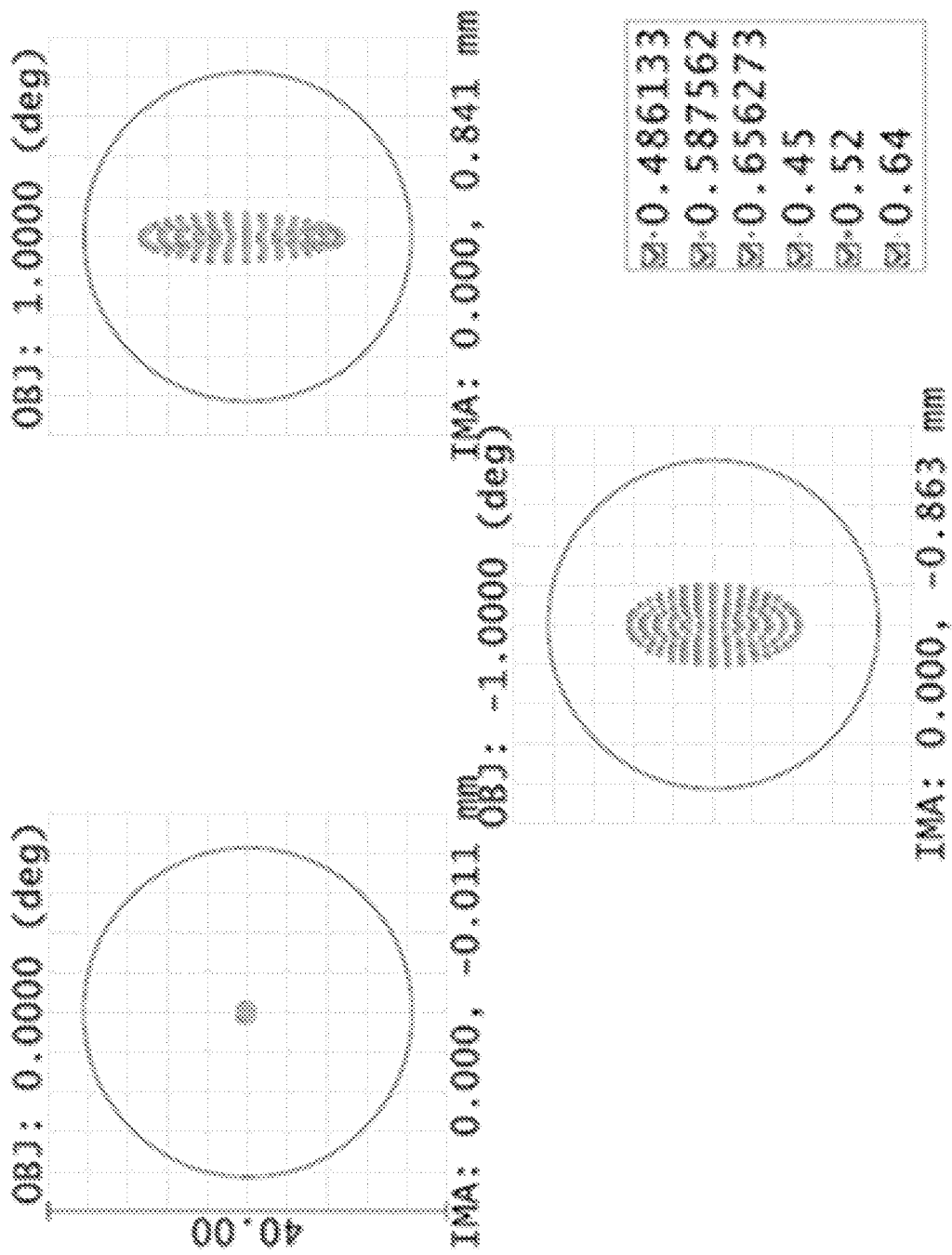
FIG. 23 is a spot diagram of the present reflective optical system with an aperture distance D=30 mm under an object distance or a VID at infinity and an aperture of 2 mm in diameter.
Figure 25:
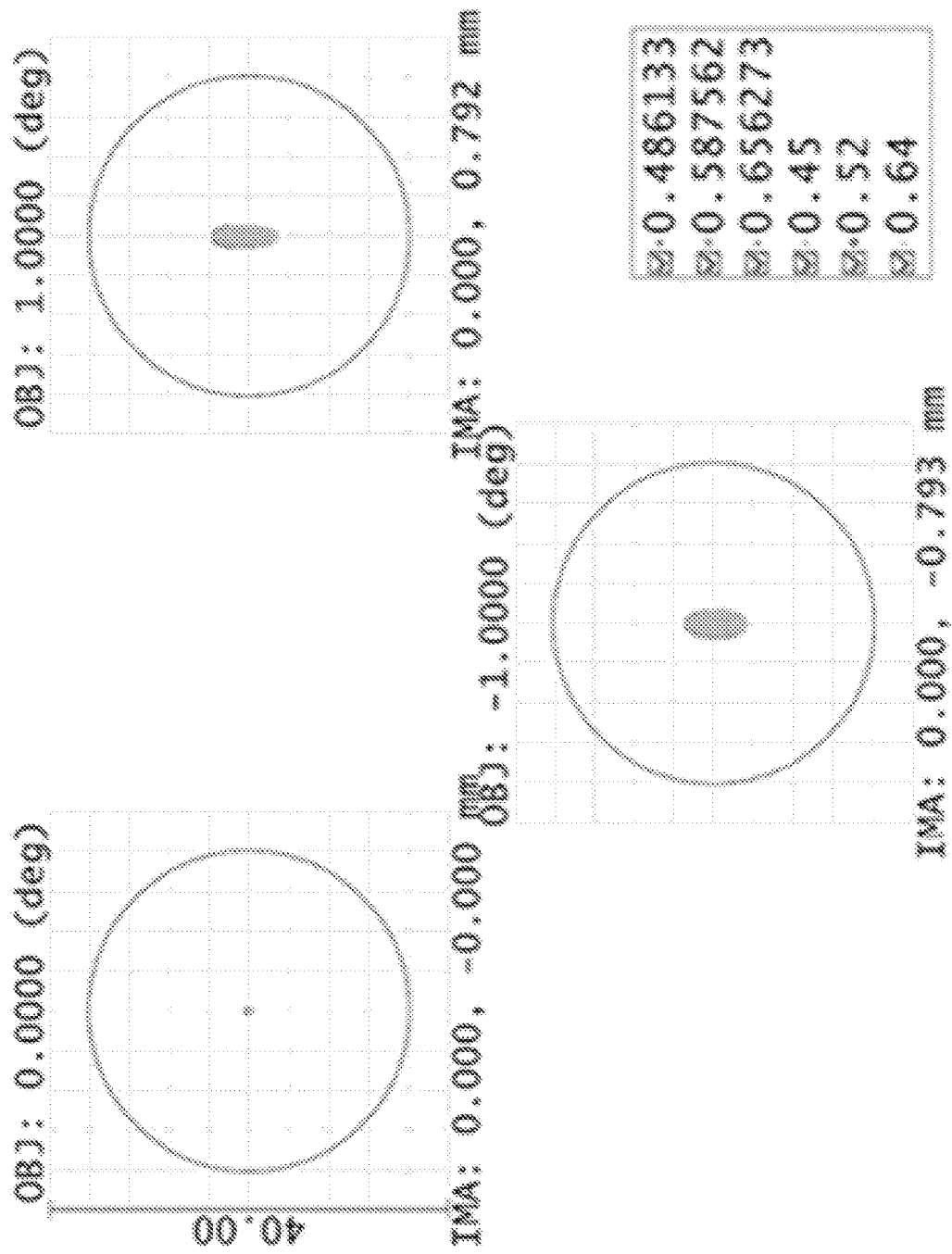
FIG. 25 is a spot diagram of the present reflective optical system with an aperture distance D=10 mm under an object distance or a VID at infinity and an aperture of 2 mm in diameter.
Figure 26:
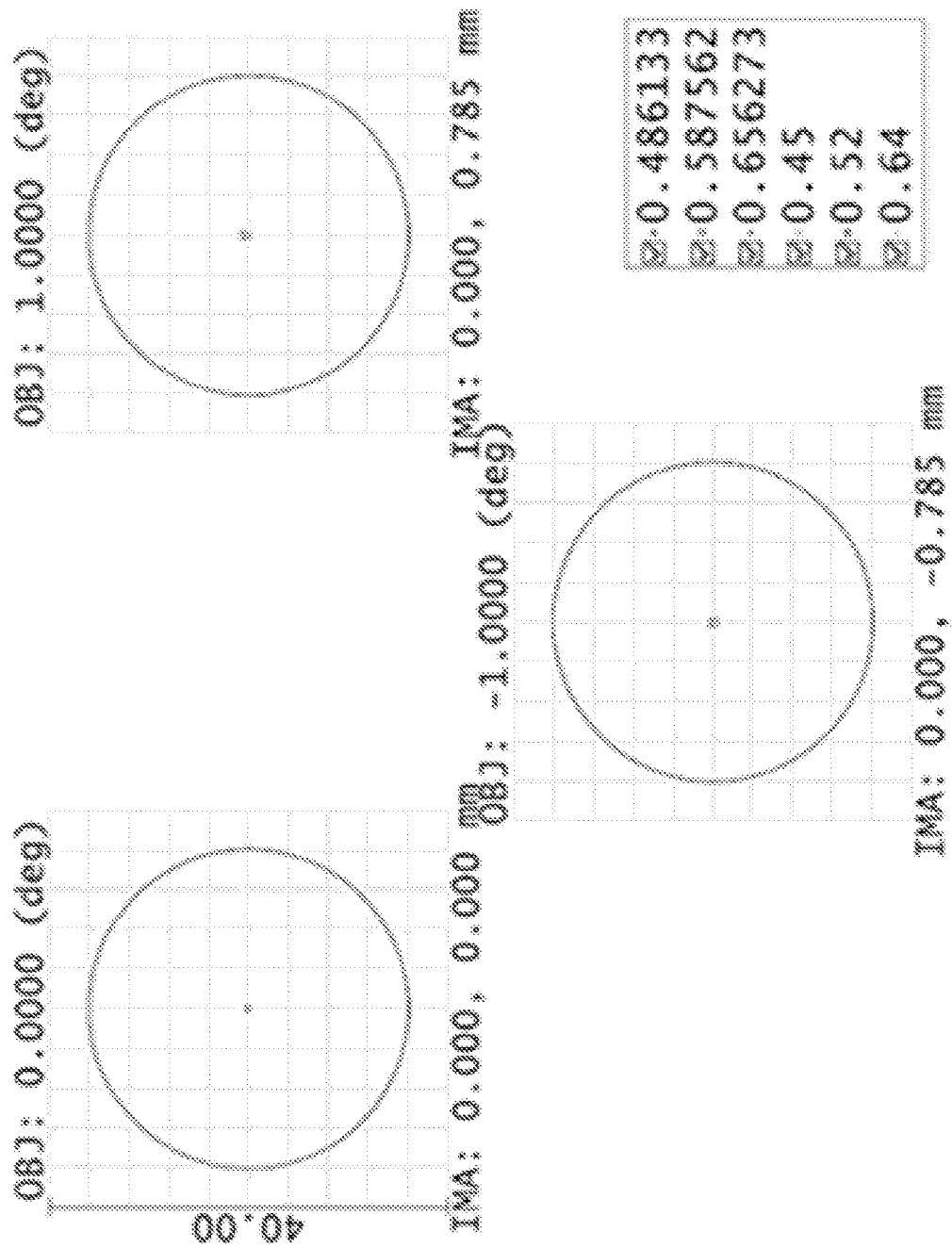
FIG. 26 depicts the optical performance of the present reflective optical system that remains diffraction limited with D=0 mm and aperture=2 mm in diameter.

FIG. 22 is a spot diagram of the present reflective optical system with an aperture distance D=40 mm under an object distance or a VID at infinity and an aperture of 2 mm in diameter. FIG. 23 is a spot diagram of the present reflective optical system with an aperture distance D=30 mm under an object distance or a VID at infinity and an aperture of 2 mm in diameter. FIG. 24 is a spot diagram of the present reflective optical system with an aperture distance D=20 mm under an object distance or a VID at infinity and an aperture of 2 mm in diameter. FIG. 25 is a spot diagram of the present reflective optical system with an aperture distance D=10 mm under an object distance or a VID at infinity and an aperture of 2 mm in diameter. FIG. 26 depicts the optical performance of the present reflective optical system that remains diffraction limited with D=0 mm and aperture=2 mm in diameter. It shall be noted that a variable aperture distance D is important for EPE measurements and applications. The optical performance remains diffraction-limited with changing aperture distances from D=0 to 40 mm, which is sufficient for most EPE devices including XR devices.

Figure 27:
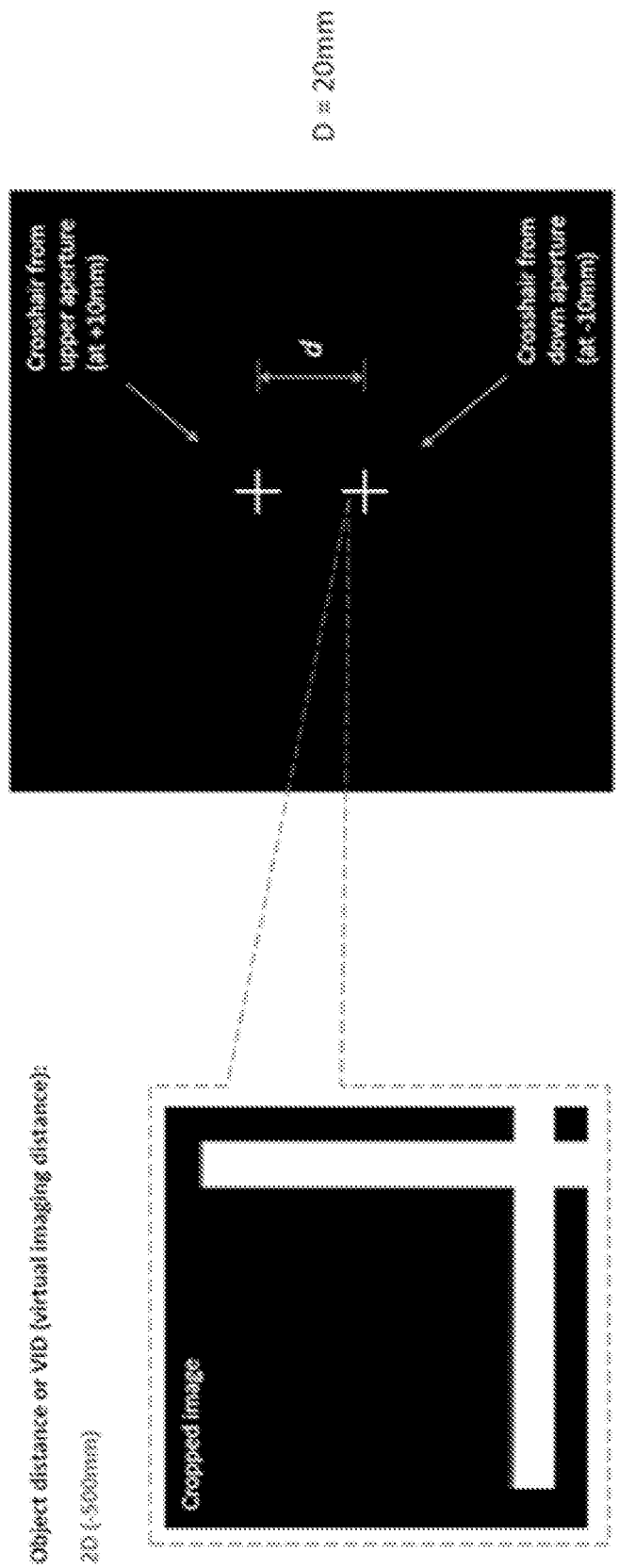
FIG. 27 depicts imaging results of a crosshair object at −500 mm (2D) VID after passing through the present reflective optical system.
Figure 28:
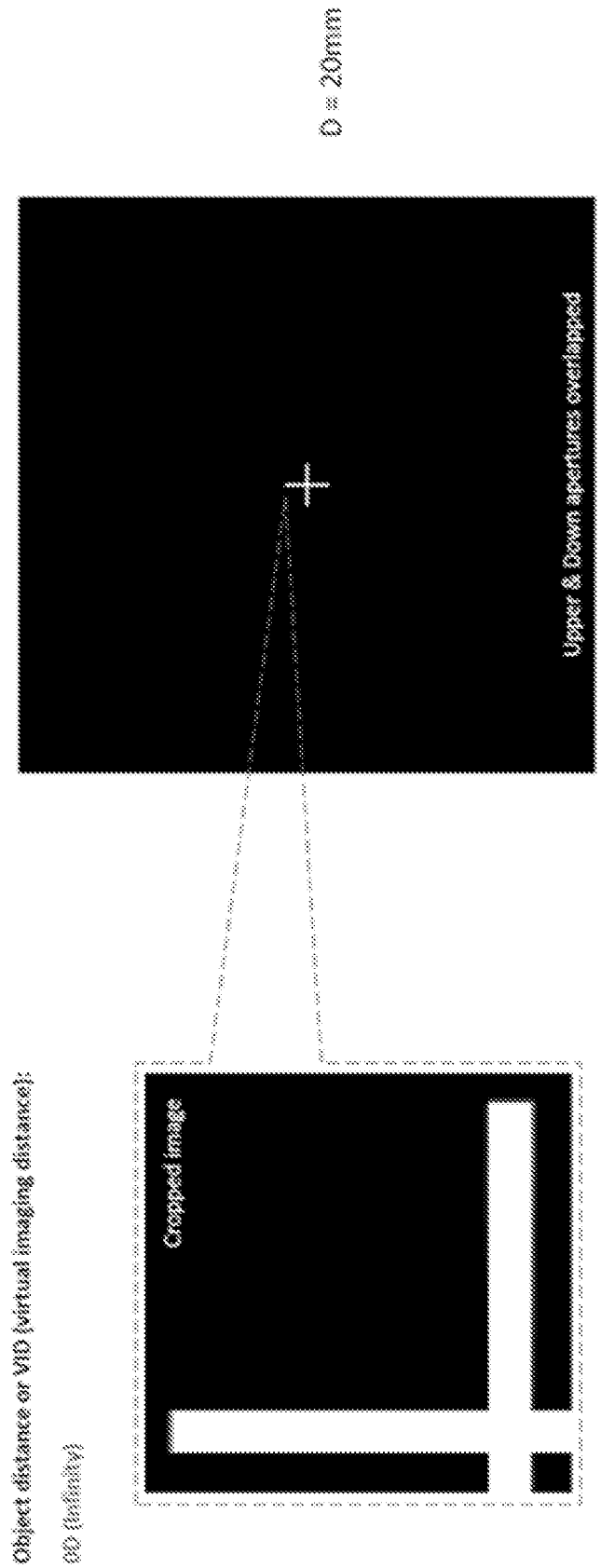
FIG. 28 depicts imaging results of a crosshair object at infinity (0D) VID after passing through the present reflective optical system.
Figure 29:
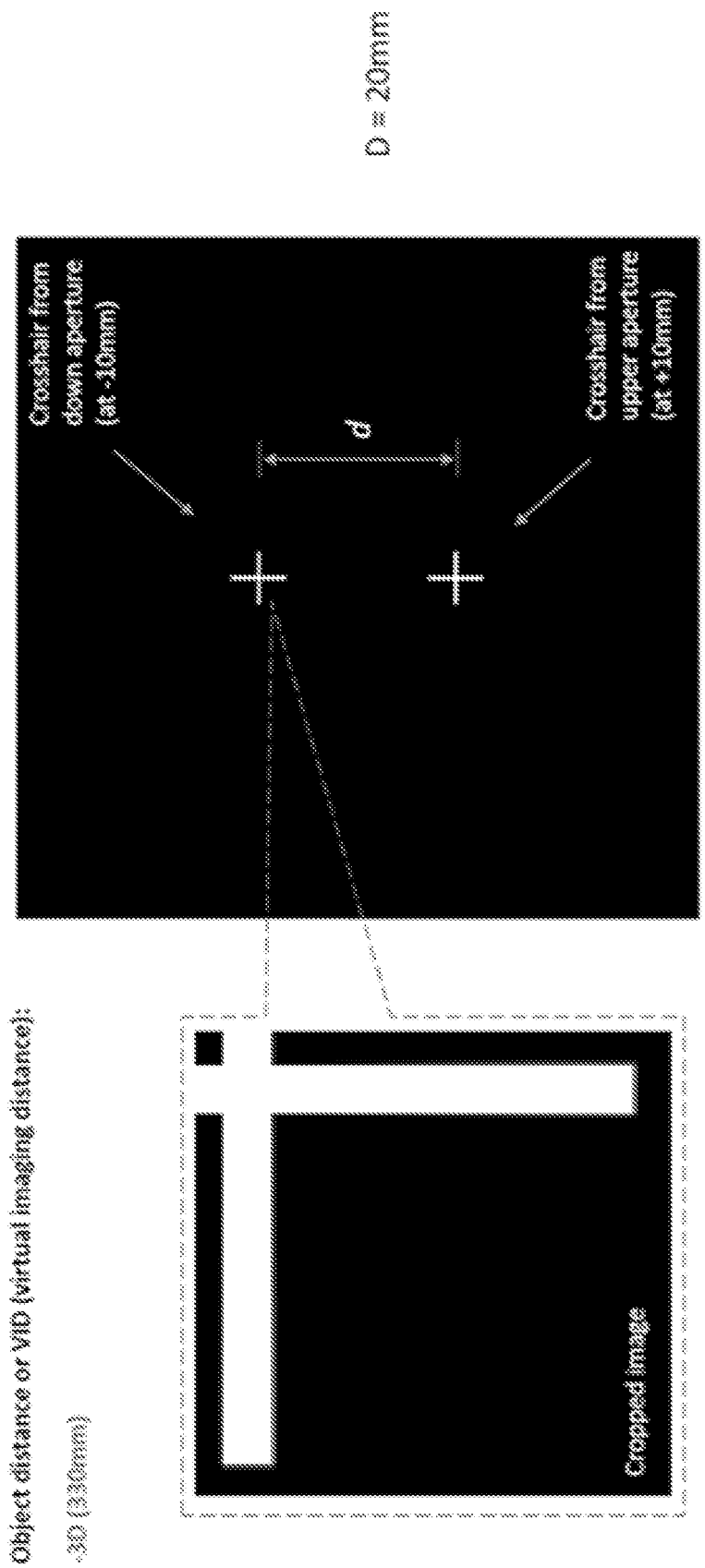
FIG. 29 depicts imaging results of a crosshair object at +330 mm (−3D) VID after passing through the present reflective optical system.

FIG. 27 depicts imaging results of a crosshair object at −500 mm (2D) VID after passing through the present reflective optical system. FIG. 28 depicts imaging results of a crosshair object at infinity (0D) VID after passing through the present reflective optical system. FIG. 29 depicts imaging results of a crosshair object at +330 mm (−3D) VID after passing through the present reflective optical system. It shall be noted that the size of the crosshair object corresponds to a 2-degree full field angle and the imaging results are very sharp across the FOV due to the diffraction-limit performance of the reflective optical system.

Figure 31:
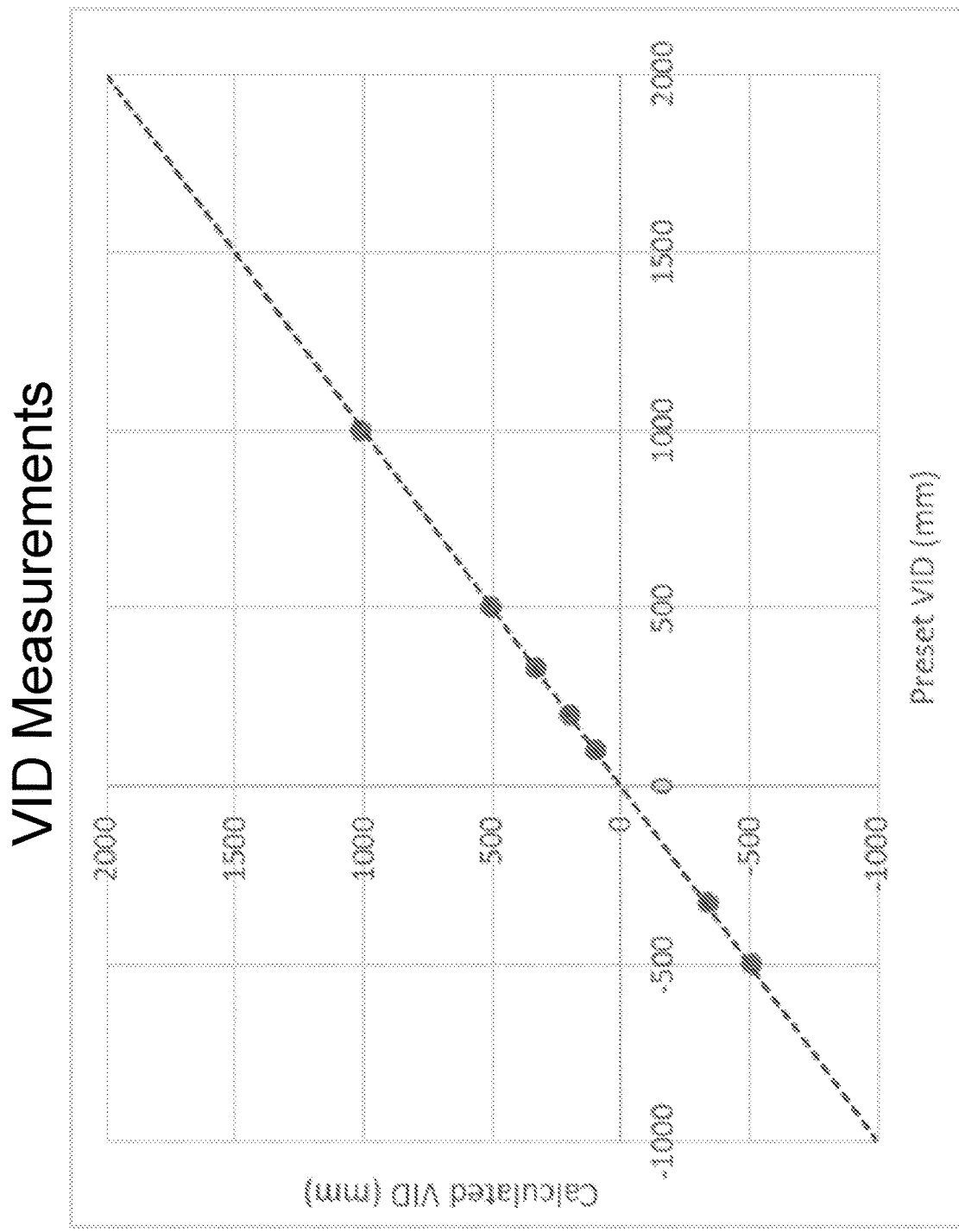
FIG. 31 depicts a curve plotted using measurement results of object distances or VIDs vs. preset values as shown in FIG. 30.

FIG. 30 depicts measurement results of object distances or VIDs compared to preset values. In addition to angular measurements for EPE devices, the proposed reflective optical system can also be used to measure the VID or object distances which are some of the most important parameters for XR devices and applications. Using Equation (1) defined elsewhere herein and f=45 mm, θ=25.679 degrees, L=30 mm, the offset (Δ) of the imaging plane from the mirror focus position can be calculated based on Equation (2) defined elsewhere herein and the measured d values. The VIDs can be calculated using Equations (6) defined elsewhere herein, based on the above measurements. It can be seen that the calculated results based on the measurements are very accurate compared to the preset VID values. FIG. 31 depicts a curve plotted using measurement results of object distances or VIDs vs. preset values, as shown in FIG. 30. The dash line is a linear trendline. It shall be noted that the preset VID values are aligned well with the calculated results based on the measurements.

Figure 32:
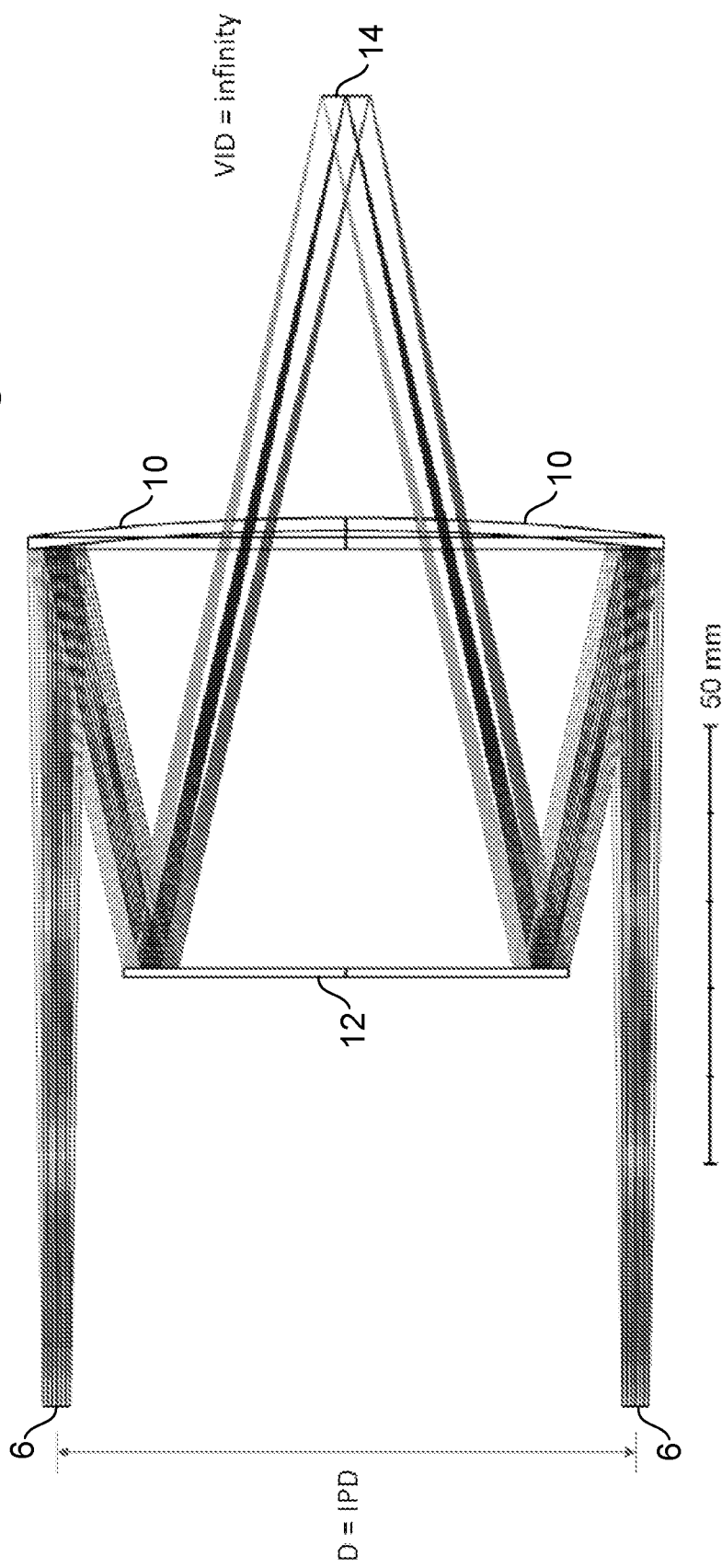
FIG. 32 depicts the optical design layout of a present optical system, e.g., a periscope system, for measurements of full XR glass system or binocular projectors at a VID of infinity.
Figure 33:
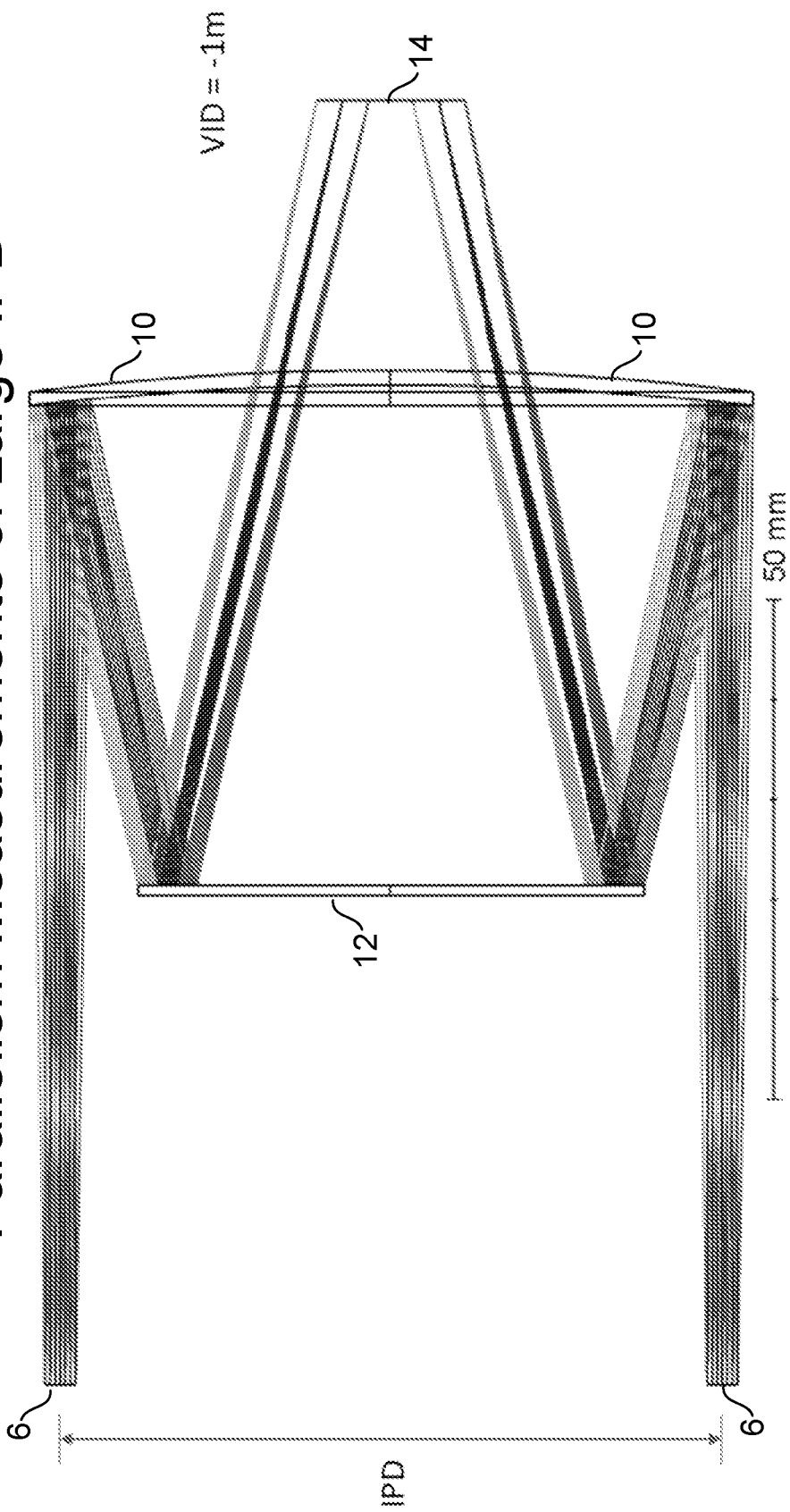
FIG. 33 depicts the optical design layout of a present optical system, e.g., a periscope system, for measurements of full XR glass system or binocular projectors at a VID of −1 m.
Figure 34:
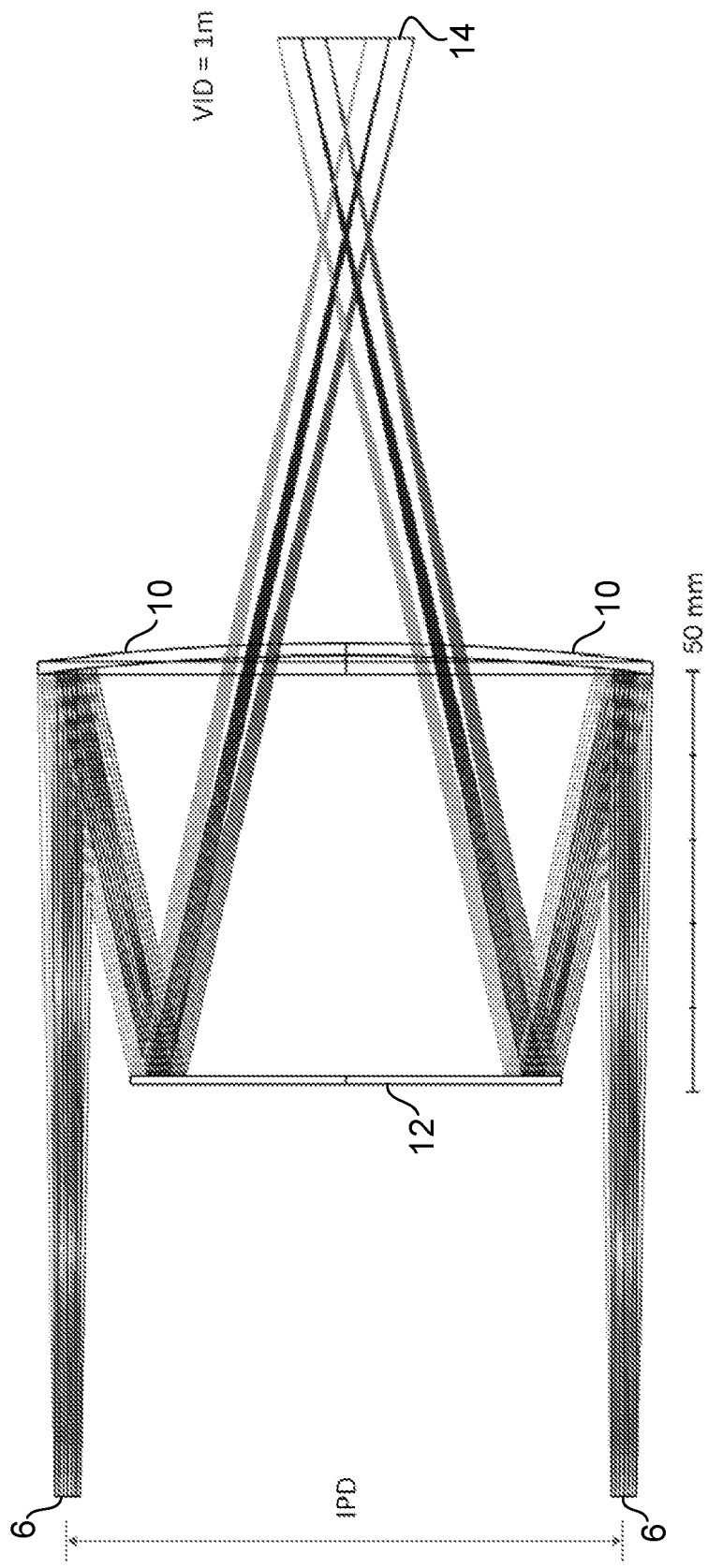
FIG. 34 depicts the optical design layout of a present optical system, e.g., a periscope system, for measurements of full XR glass system or binocular projectors at a VID of +1 m.

FIG. 32 depicts the optical design layout of a present optical system, e.g., a periscope system, for measurements of full XR glass system or binocular projectors at a VID of infinity. FIG. 33 depicts the optical design layout of a present optical system, e.g., a periscope system, for measurements of full XR glass system or binocular projectors at a VID of −1 m. FIG. 34 depicts the optical design layout of a present optical system, e.g., a periscope system, for measurements of full XR glass system or binocular projectors at a VID of +1 m. With further increasing the aperture distance, the present optical system can be used to measure the parallelism of optical rays from a full XR glass system or optical rays from two display projectors before being coupled to the waveguides. In one example, D=65 mm for the pupil IPD or D=125 mm for the projector IPD.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An optical system for measuring a parallelism of light rays of a light emitter and virtual imaging distances (VIDs) of the light emitter, said optical system comprising:
   (a) an enclosure comprising a front end and a rear end;
   (b) a pair of apertures configured to be disposed on said front end of said enclosure on a central plane;
   (c) a pair of first mirrors disposed interior of said enclosure; and
   (d) a second mirror disposed interior of said enclosure, wherein a first aperture of said pair of apertures comprises a first pupil configured to allow a first set of light rays into said enclosure at a first of said pair of first mirrors before being directed to said second mirror which redirects it to be cast as a first spot on an imaging plane, a second aperture of said pair of apertures comprises a second pupil configured to allow a second set of light rays into said enclosure at a second of said pair of first mirrors before being directed to said second mirror which redirects it to be cast as a second spot on the imaging plane, wherein a parallelism of the first set of light rays with respect to the second set of light rays is based on a correspondence of a distance between said first spot and said second spot with a distance between the first set of light rays and the second set of light rays and a VID of the light emitter is based at least in part on an offset of the imaging plane from the focus position of each of the first mirrors when the light emitter is not optically disposed at infinity.

2. The optical system of claim 1, wherein each said first mirror is a concave mirror.

3. The optical system of claim 1, wherein said pair of first mirrors are portions of a larger mirror.

4. The optical system of claim 1, wherein each first mirror of said pair of first mirrors comprises a radius of about 200-400 mm.

5. The optical system of claim 1, wherein the light emitter is a waveguide.

6. The optical system of claim 5, wherein the waveguide is an exit pupil expansion device.

7. The optical system of claim 1, wherein the imaging plane is an imaging plane of an image capture device.

8. The optical system of claim 7, said image capture device comprises a controller configured to receive an image of said first spot and said second spot, wherein said controller is configured to determine if said first spot and said second spot are disposed on a central plane of said optical system and a distance between said first spot and said second spot corresponds with a distance between the first set of light rays and the second set of light rays, if at least one of said first spot and said second spot is not disposed on said central plane, the first set of light rays and the second set of light rays are not disposed in parallel and if said distance between said first spot and said second spot does not correspond with said distance between the first set of light rays and the second set of light rays, the first set of light rays and the second set of light rays are not disposed in parallel.

9. The optical system of claim 1, at least one of the first set of light rays and the second set of light rays comprises a crosshair shape such that an angular deviation of the first set of light rays or the second set of light rays is discernible on the imaging plane.

10. An optical system for measuring a parallelism of light rays of a light emitter and virtual imaging distances (VIDs) of the light emitter, said optical system comprising:
   (a) an enclosure comprising a front end and a rear end;
   (b) a pair of apertures configured to be disposed on said front end of said enclosure on a central plane;
   (c) a first mirror disposed interior of said enclosure, said first mirror comprises a clear aperture disposed therein; and
   (d) a second mirror disposed interior of said enclosure, wherein a first aperture of said pair of apertures comprises a first pupil configured to allow a first set of light rays into said enclosure at a first portion of said first mirror before being directed to said second mirror which redirects it through said clear aperture of said first mirror to be cast as a first spot on an imaging plane, a second aperture of said pair of apertures comprises a second pupil configured to allow a second set of light rays into said enclosure at a second portion of said first mirror before being directed to said second mirror which redirects it through said clear aperture to be cast as a second spot on the imaging plane, wherein a parallelism of the first set of light rays with respect to the second set of light rays is based on a correspondence of a distance between said first spot and said second spot with a distance between the first set of light rays and the second set of light rays and a VID of the light emitter is based at least in part on an offset of the imaging plane from a focus position of the first mirror when the light emitter is not optically disposed at infinity.

11. The optical system of claim 10, wherein said first mirror is a concave mirror.

12. The optical system of claim 10, wherein said first mirror comprises a radius of about 200-400 mm.

13. The optical system of claim 10, wherein the light emitter is a waveguide.

14. The optical system of claim 13, wherein the waveguide is an exit pupil expansion device.

15. The optical system of claim 10, wherein the imaging plane is an imaging plane of an image capture device.

16. The optical system of claim 15, said image capture device comprises a controller configured to receive an image of said first spot and said second spot, wherein said controller is configured to determine if said first spot and said second spot are disposed on a central plane of said optical system and a distance between said first spot and said second spot corresponds with a distance between the first set of light rays and the second set of light rays, if at least one of said first spot and said second spot is not disposed on said central plane, the first set of light rays and the second set of light rays are not disposed in parallel and if said distance between said first spot and said second spot does not correspond with said distance between the first set of light rays and the second set of light rays, the first set of light rays and the second set of light rays are not disposed in parallel.

17. The optical system of claim 10, at least one of the first set of light rays and the second set of light rays comprises a crosshair shape such that an angular deviation of the first set of light rays or the second set of light rays is discernible on the imaging plane.

* * * * *